(12) United States Patent
Kumar et al.

(10) Patent No.: US 9,381,723 B2
(45) Date of Patent: **\*Jul. 5, 2016**

(54) MICROCELLULAR THERMOPLASTIC THIN FILMS FORMED BY A SOLID-STATE FOAMING PROCESS

(75) Inventors: Vipin Kumar, Seattle, WA (US); John Chunpo Lu, Edmonds, WA (US); Henry G. Schirmer, Spartanburg, SC (US); Dustin Miller, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/678,136

(22) PCT Filed: Sep. 12, 2008

(86) PCT No.: PCT/US2008/076306
§ 371 (c)(1),
(2), (4) Date: Aug. 4, 2010

(87) PCT Pub. No.: WO2009/036384
PCT Pub. Date: Mar. 19, 2009

(65) Prior Publication Data
US 2010/0297416 A1    Nov. 25, 2010

Related U.S. Application Data

(60) Provisional application No. 60/971,850, filed on Sep. 12, 2007.

(51) Int. Cl.
*B32B 3/26* (2006.01)
*B32B 27/08* (2006.01)
(Continued)

(52) U.S. Cl.
CPC ............. *B32B 27/08* (2013.01); *B29C 44/3453* (2013.01); *B32B 5/145* (2013.01); *B32B 5/32* (2013.01); *B32B 27/308* (2013.01); *B32B 27/32* (2013.01); *B32B 27/365* (2013.01); *B32B 2250/42* (2013.01); *B32B 2266/08* (2013.01); *B32B 2307/7244* (2013.01); *B32B 2439/00* (2013.01); *Y10T 428/24355* (2015.01);
(Continued)

(58) Field of Classification Search
CPC .................................. B32B 27/80; B32B 5/32
USPC .......... 428/315.5, 315.7, 316.6, 315.9, 319.3, 428/319.7, 319.9, 314.4, 314.8
See application file for complete search history.

(56) References Cited

U.S. PATENT DOCUMENTS 3,227,664 A * 1/1966 Blades et al. ................. 521/144
7,807,260 B2 * 10/2010 Nadella et al. ............. 428/316.6
(Continued)

FOREIGN PATENT DOCUMENTS

WO    WO 2005021622 A2 * 3/2005

*Primary Examiner* — Hai Vo
(74) *Attorney, Agent, or Firm* — Christensen O'Connor Johnson Kindness PLLC

(57) ABSTRACT

Cellular thin films include a first side separated from a second side, the separation of which defines the thickness of the thin film; at least one layer of a polymeric material arranged along the thickness of the thin film, wherein the polymeric material includes cells and the first and second sides of the thin film have exterior surfaces that have substantially the same thickness as the interior walls forming the cells. The surfaces of the thin films have bumps caused by the cells. The thin exterior surfaces of the thin films is advantageous to allow the films to be flexible.

25 Claims, 20 Drawing Sheets

(51) Int. Cl.
  *B32B 5/32* (2006.01)
  *B32B 5/14* (2006.01)
  *B29C 44/34* (2006.01)
  *B32B 27/30* (2006.01)
  *B32B 27/32* (2006.01)
  *B32B 27/36* (2006.01)
(52) U.S. Cl.
  CPC ............... *Y10T428/249953* (2015.04); *Y10T 428/249978* (2015.04)

(56) References Cited

U.S. PATENT DOCUMENTS

| | | | |
|---|---|---|---|
| 7,875,345 B1* | 1/2011 | Simpson et al. | 428/317.9 |
| 2002/0197450 A1* | 12/2002 | Orologio | 428/178 |
| 2005/0112356 A1* | 5/2005 | Rynd et al. | 428/317.9 |
| 2005/0181196 A1* | 8/2005 | Aylward et al. | 428/304.4 |
| 2006/0211781 A1* | 9/2006 | Strandburg et al. | 521/74 |
| 2008/0213565 A1* | 9/2008 | Simpson et al. | 428/319.1 |
| 2009/0104420 A1* | 4/2009 | Nadella et al. | 428/218 |

* cited by examiner

MICROCELLULAR THERMOPLASTIC THIN FILMS FORMED BY A SOLID-STATE FOAMING PROCESS

CROSS-REFERENCE TO RELATED APPLICATION

This application claims the benefit of U.S. Provisional Patent Application No. 60/971,850, filed Sep. 12, 2007, the disclosure of which is incorporated expressly herein by reference in its entirety.

BACKGROUND

A solid-state foaming process is illustrated in FIG. 1 wherein foaming occurs while the polymer remains in the solid state throughout the foaming process. This process differs from other conventional polymer foaming processes because the polymer is not required to be in a molten state. Generally, at the beginning of the method, the polymer is in equilibrium with the surrounding temperature and pressure so that the polymer is "unsaturated." In block 102, the thermoplastic polymer is treated at an elevated pressure to cause the thermoplastic polymer to absorb gas. The treatment of the polymer in block 102 may be carried out in a pressure vessel, which is sealed, and then the material is exposed to a high pressure inert gas such as, but not limited to, carbon dioxide at room temperature within the pressure vessel. The high pressure gas will then start to diffuse into the thermoplastic polymer over time, filling the polymer's free intermolecular volume. The gas will continue to saturate the polymer until equilibrium is reached. In block 104, the fully saturated polymer is removed from the saturation pressure to an environment of lower pressure so that the polymer is thermodynamically unstable, meaning that the polymer is supersaturated with gas and is no longer at equilibrium with the surrounding environment. The polymer will start to desorb gas from its surface into the surrounding environment. Desorption of the polymer can occur when the high pressure gas is vented from the pressure vessel or the saturated thermoplastic polymer is removed into ambient atmospheric pressure. Heating of the partially saturated polymer in block 106 is generally carried out in a liquid bath. Heating produces a cellular thermoplastic polymer. Since the polymer is still in a solid state, the foams thus produced are called solid-state foams to distinguish them from foams that are produced in an extruder from a polymer melt. The cellular thermoplastic polymer is less dense than the noncellular polymer, thus saving material costs. However, depending on the polymer, the size of the cells, and relative density, the cellular polymer may or may not possess desirable characteristics.

A cellular article made by the above-described process is shown in FIG. 2. The article includes a cellular structure in the interior. However, there is no cellular structure immediately adjacent to the surfaces. The non-cellular structure forms an "integral skin" on both the upper and lower surface. While the solid-state foaming process has been used on sheets thicker than 0.25 mm, it is currently unknown whether the solid-state foaming process could be applied to polymeric thin films successfully.

SUMMARY

A first embodiment disclosed herein is related to a cellular thin film. The cellular thin film includes a first side separated from a second side, the separation of which defines the thickness of the thin film; at least one layer of a polymeric material arranged along the thickness of the thin film, wherein the polymeric material includes cells and the first and second sides of the thin film have exterior surfaces that have substantially the same thickness as walls forming the cells. The cellular thin film may be flexible. The cellular thin film may have a relative density of 11% to 75%, such as poly(lactic acid), or a relative density of 5% to 27%, such as poly(lactic acid), or a relative density of 35% to 99%, such as polycarbonate and polyetherimide, or a relative density of 44% to 99%, for cyclic olefin copolymer. The exterior surfaces of the thin film may have a thickness of about 2 μm. The thin film may have two or more layers of the same or different polymeric material. The two or more layers can be a thermoplastic material. The two or more layers can be selected from the group consisting of poly(lactic acid), polyethylene, ethylene vinyl acetate, low density polyethylene, methylacrylate, an EMA polymer and a cyclic olefin copolymer. The thin films can have an average of one to three cells arranged along the thickness of the thin film. The cells can have a size of 50 μm to 150 μm. The exterior surfaces of the thin films can have bumps formed by the cells. The thin exterior surfaces of the thin films makes the films flexible. The thin films can either be monolayer thin film or a multilayer thin film. The cellular monolayer and multilayer thin films are prepare from solid thin films having a thickness within the range of 0.01 mm to 0.25 mm.

Another embodiment is related to a cellular multilayered thin films, including a first side separated from a second side, the separation of which defines the thickness of the thin film; a plurality of layers arranged along the thickness of the thin film, each layer having a first side and a second side, at least one side of each layer being juxtaposed next to one side of at least one other layer, wherein each layer is a polymeric material; and cells between a side of a first layer and a side of a second layer that is juxtaposed next to the first layer. The cellular multilayered thin films may be flexible. The cellular multilayered thin films may have a relative density of 5% to 99%. The cellular multilayered thin films may have two or more layers of the same or different polymeric material. The two or more layers are a thermoplastic material. The two or more layers can be selected from the group consisting of poly(lactic acid), polyethylene, ethylene vinyl acetate, low density polyethylene, methylacrylate, an EMA polymer and a cyclic olefin copolymer. The cellular multilayered thin films may have a first and a second layer each layer being juxtaposed next to only one other layer, the first and the second layer being the exteriormost layer on the first and the second side of the thin film. The first and the second exteriormost layer on the first and the second side of the thin film can be a different polymeric material than any other layer. The first and the second exteriormost layer on the first and the second side of the thin film can be a different polymeric material from each other. The first and the second exteriormost layer on the first and the second side of the thin film can be the only layers in the thin film. The cellular multilayered thin films can have a plurality of interior layers between the first and the second exteriormost layer, wherein the interior layers comprise alternating layers of different polymeric materials, or the plurality of interior layers between the first and the second exteriormost layer can be the same polymeric material. The cellular thin films can have a plurality of interior layers between the first and the second exteriormost layer, wherein the exteriormost and interior layers are the same polymeric material. The multilayer cellular thin films can have cells between the first and second layer. The multilayer cellular thin films can have intralayer cells and/or inter layer cells which can be microcellular cells or nanocellular cells.

The solid-state foaming process has three major stages: gas absorption, gas desorption and heating of the polymer-gas system. This process works well for sheets over 0.25 mm thick. For thin films (0.01 to 0.25 mm), it is questionable whether this process would be effective. The second stage, gas desorption, provides an obstacle for foaming thin films. Gas leaves the system relatively quickly and whether enough gas is present to foam is highly dependent on the desorption time. Desorption time is often intentional, but can also be determined by equipment and processing capabilities. The obstacle of foaming thin films is to either reduce the desorption time or maintain a constant desorption time. An advantage of one embodiment of the present invention is the discovery that thin films, or sheets less than 0.25 mm in thickness were successfully foamed. The cellular monolayer and multilayer thin films disclosed herein can have wide uses in the plastics industry. Their uses can range from barriers, liners, coatings, packaging and insulation. Cellular thin films have the advantage of occupying a very small volume. Creating a foamed thin film with microcellular and nanocellular cells is disclosed. Thermal, dielectric and permeability properties can be enhanced by the foamed structure.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Thin films as discussed in this application relate to materials that are flexible. Thin films are comprised of one or more than one polymer layers. A layer is comprised of a monolithic piece of material and can be any homopolymer, copolymer, block polymer, or multipolymer. A monolayered thin film is comprised of a single layer, while a multilayered thin film is comprised of more than one layer. Flexible polymeric thin films have many uses, such as barriers in food and beverage containers, for example. Multilayered thin films have the advantage that one polymer material can be placed on one side and a different polymer material can be placed on the opposite side to take advantage of the properties of the different materials. To save on material while retaining the desirable properties of solid thin films, a flexible and cellular polymeric mono and multilayered thin film is disclosed. The cellular polymeric mono or multilayered thin films disclosed herein are flexible, which allows them to be used as coatings and any other applications where the solid polymeric mono or multilayered thin films might be used. A method for making the cellular polymeric mono or multilayered thin films is also disclosed.

Figure 1:
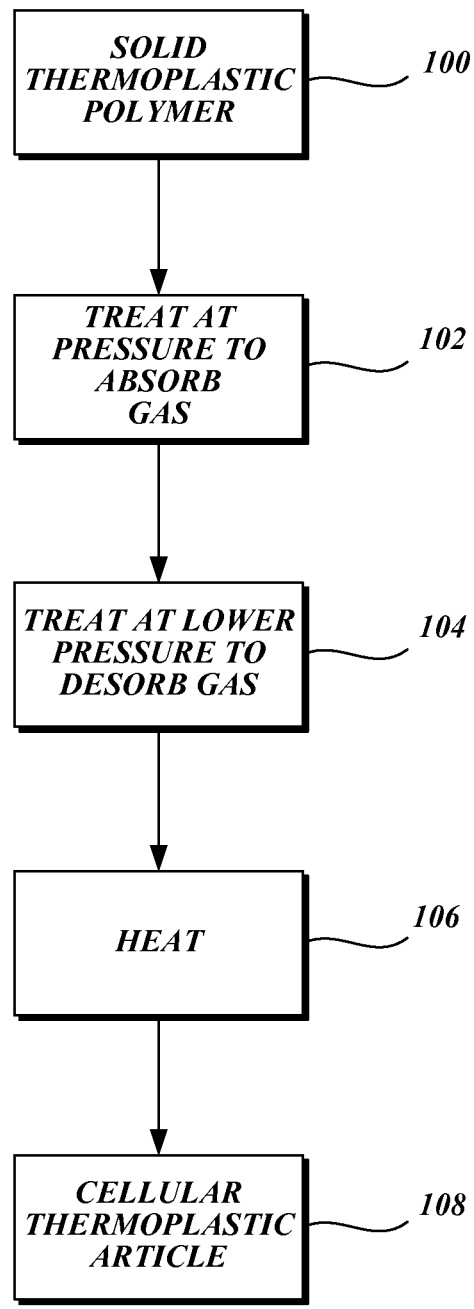
FIG. 1 is a flow diagram of a related art method for foaming thick solid thermoplastic material.
Figure 2:
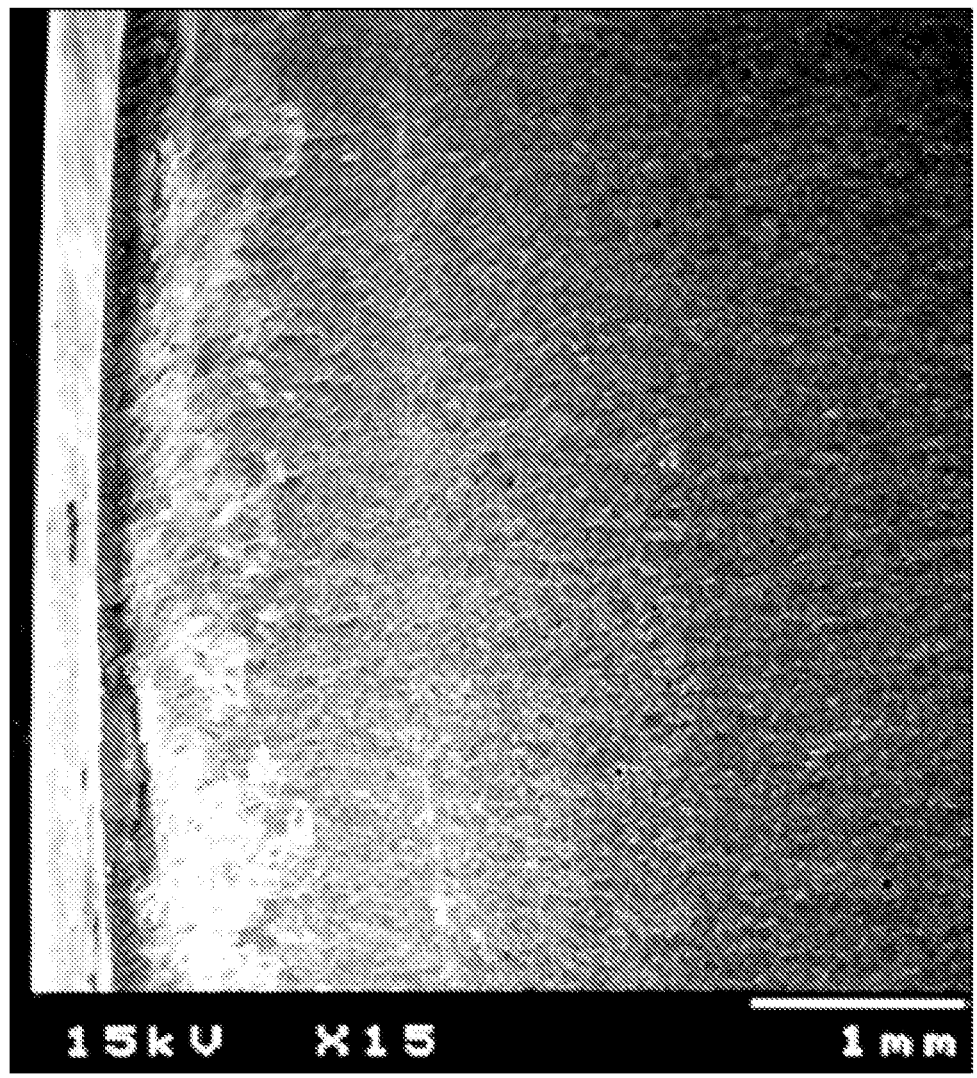
FIG. 2 is a scanning electron micrograph of a cellular thermoplastic material made in accordance with the method of FIG. 1.
Figure 3:
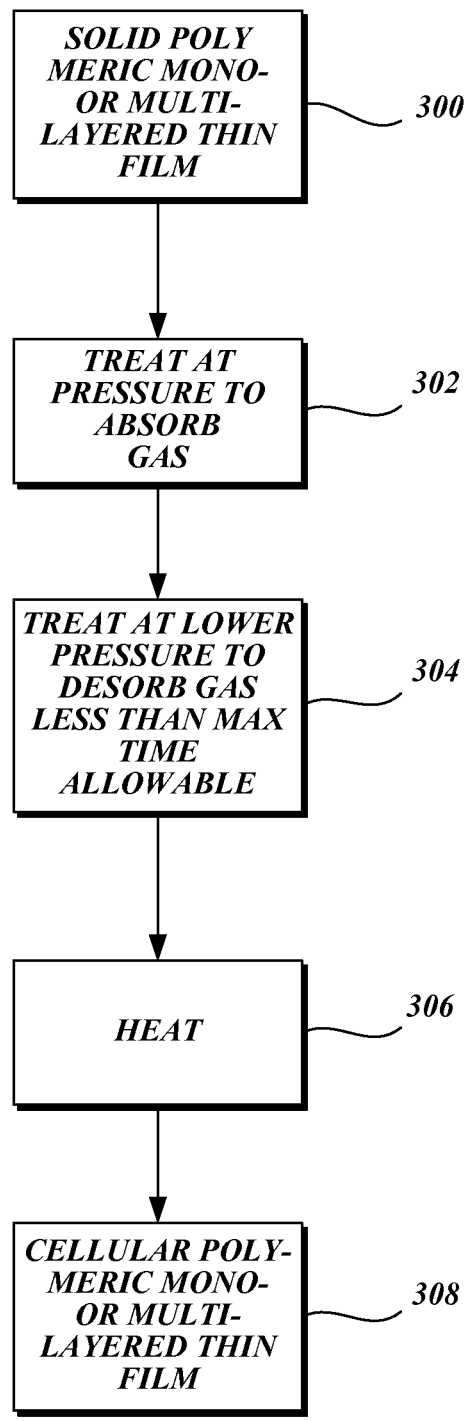
FIG. 3 is a flow diagram of a method for making a cellular polymeric mono or multilayered thin film.

Referring to FIG. 3, one embodiment of a method for producing a cellular polymeric mono or multilayered thin film is provided. The method illustrated in FIG. 3 includes block 300. In block 300, a solid polymeric mono or multilayered thin film is obtained. A thin film, as used herein, is material having one or a plurality of layers and a thickness in the range of 0.01 mm to 0.25 mm. The solid thin film can be a monolayer or a multilayered solid thin film. A monolayer thin film has a monolithic material throughout the thickness of the thin film. A multilayered thin film comprises more than one layers of monolithic materials, which together have a thickness from 0.01 mm to 0.25 mm. One mil is one one-thousandth of an inch. For example, any two or more of the following materials can be combined in any sequence and in any number, as long as the overall thickness remains 0.01 to 0.25 mm. Suitable polymers for the mono and multilayered thin films include, but are not limited to, thermoplastic polymers, poly(lactic acid) (PLA), polycarbonate (PC), polyetherimide (PEI), polyethylene, ethylene vinyl acetate, low density polyethylene (LDPE), methylacrylate, an EMA polymer and a cyclic olefin copolymer (COC). A representative method of making coextruded solid polymeric multilayered thin films is disclosed in U.S. Pat. Nos. 5,762,971 and 6,000,926, issued to Schirmer.

From block 300, the method enters block 302. In block 302, the solid polymeric mono or multilayered thin film is treated under pressure with one or more gases. The polymeric mono or multilayered thin film can be enclosed in a sealed pressure vessel, for example, from which air has been evacuated or purged and then any one or more suitable gas or gases is introduced into the pressure vessel. Representative of the one or more gases are carbon dioxide and/or nitrogen. A suitable pressure at which to treat the solid polymeric mono or multilayered thin film in step 302 is from 0.35 MPa to 7.5 MPa. A representative temperature at which to treat the solid polymeric mono or multilayered thin film in step 302 is room temperature. However, the temperature can be adjusted to achieve sufficient gas absorption. In block 302, the solid polymeric mono or multilayered thin film can be saturated completely. The amount of time for complete saturation can be determined beforehand. For example, a test using a sample of the thin film can be conducted at a given temperature and pressure. The sample can be pulled from the pressure vessel and measured for weight at various time intervals. When the weight of the sample ceases to increase over time, the sample has reached complete saturation for the given temperature and pressure. The time can be noted, and various tables for complete saturation can be created for any given combination of temperature and pressure conditions. Knowing those conditions, the time that the thin film should remain within the pressure vessel for complete saturation can be known ahead of time. Various testing procedures can be conducted to know the time of complete saturation for any polymers and thicknesses.

In block 304, the solid polymeric mono or multilayered thin film treated in block 302 is treated at a lower pressure and/or at a lower temperature to allow the one or more gases to partially desorb to achieve partial saturation. Desorption can proceed at ambient atmospheric pressure and temperature or at controlled pressures and temperatures. For thin films of various polymers within the range of 0.01 mm to 0.25 mm thick, desorption has to proceed for not more than the maximum time allowable. Other polymers or combination of polymers in a multilayered thin film can similarly undergo desorption time/gas concentration testing to determine the suitable amount of gas for consistent foaming at various thicknesses.

In order to form a flexible and cellular thin film starting from a solid thin film in the range of 0.01 mm to 0.25 mm, the process conditions are adjusted to achieve a low gas concentration that can produce larger cells, such that the exterior surface (substantially an exterior cell wall) of the cellular thin film is substantially the same thickness as the cell wall in the interior of the thin film. Generally, higher gas concentration leads to smaller bubbles and lower gas concentrations lead to larger bubbles. In block 302, for example, the saturation pressure can be decreased and/or the saturation temperature increased. Additionally, the desorption time in block 304 can also be adjusted. The process conditions can be adjusted so that the cells are of a size that will produce a surface at the thin film exterior that is substantially the same thickness as the cell wall in the interior of the thin film. This will provide for a flexible thin film as well. Furthermore, the thin exterior surface of the cellular thin film will have bumps created by the cells.

Figure 4:
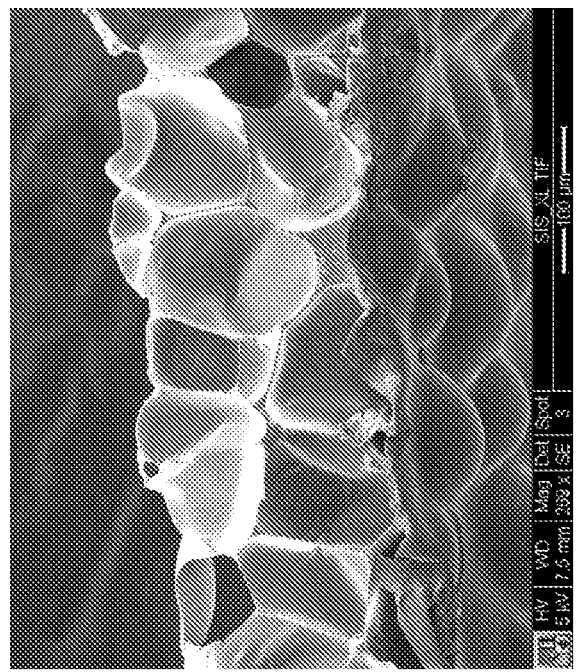
FIG. 4 is a scanning electron micrograph of a cellular polymeric monolayered thin film made according to the method of FIG. 3 showing a cross-section of a 17% relative density foamed PLA monolayer structure with about 2 bubbles across the thickness.

In an alternative embodiment in block 302, the one or more gases are allowed to only partially saturate into the solid polymeric mono or multilayered thin film. The suitable concentration of the one or more gases in the latter embodiment can also be determined through desorption time/gas concentration testing. Unlike thicker films (>0.25 mm), wherein desorption creates an integral non-cellular outer skin, the cellular structures produced by the method according to FIG. 3 do not have an integral non-cellular outer skin. The "skin" is generally the thickness of the cell wall in the interior. Referring to FIG. 4, a cellular polymeric monolayered thin film produced by the method according to FIG. 3 is illustrated. The material of FIG. 4 is PLA, however, by adjusting gas concentration, it is possible to create similar structures from other materials. FIG. 4 shows a microcellular thin film that includes a front surface separated from a back surface, wherein the separation between surfaces is the thickness of the thin film. The thin film on average includes from one to three cells arranged along the thickness of the thin film, wherein the cells have an average size of 50 µm 150 µm. The characterization of microcellular structures can be performed by imaging the structures with a scanning electron microscope (SEM), such as a digital FEI Siriron scanning electron microscope. When reporting the size of cells, the measurement is of the cell's largest dimension.

The front and back surfaces of a monolayered thin film have generally the same thickness as the interior cell walls forming the cells. In other words, there is no non-cellular integral skin formed according to the method of FIG. 3. The surfaces (or "skins") of the cellular polymeric monolayered thin film substantially have the cell walls as the exposed exterior surfaces. Furthermore, the cells form at the surface giving a bumpy surface texture that can be seen in FIG. 4. The bubble nucleation that leads to cell creation appears near the surface of the thin film. Furthermore, the cellular monolayered thin film is substantially impermeable to air even at high pressure differences. The density of the thin film is at least 13% compared to the density of the solid non-cellular polymeric thin film (13% relative density). Density can be measured according to ASTM standard D792. The flotation weight loss method uses distilled water as the liquid. The sample is first weighed "dry," and then the sample is placed below the surface of the water and weighed again. The equation used to calculate the density of the polymer sample is:

$$D = \left(\frac{W_d}{W_d - W_w}\right) \cdot D_w \qquad (1)$$

where,
D=density of the sample
$W_d$=dry weight
$W_w$=wet weight
$D_w$=density of distilled water (taken as 0.9975 g/cm$^3$)

Density is reported as relative density or void fraction. Relative density is the density of the foamed material divided by the density of the unfoamed material. Void fraction is defined as one minus the relative density. Both relative density and void fraction are expressed as a percentage. For example, a material with 60% relative density means that the total volume of the foamed sample is 60% polymer and 40% void space.

In one embodiment, the cellular polymeric monolayered thin film has a white, frosted appearance and is rough to the touch.

In block 306, the solid polymeric mono or multilayered thin film is heated to create the cellular structure. In the case involving PLA, the temperature for heating in block 306 is in the range of 40° C. to 100° C. Foaming temperature ranges for other polymers are given in FIG. 18. For COC, the range is approximately 50° C. to 150° C. For PEI, the range is approximately 100° C. to 210° C. For PC, the range is approximately 80° C. to 160° C. Heating, particularly in the case for commercial applications, can be by a flotation/impingement air oven that can accept sheets of PLA. However, other heating methods, such as infrared, heated liquid bath, or heated pressure plates, can also be used.

Figure 5:
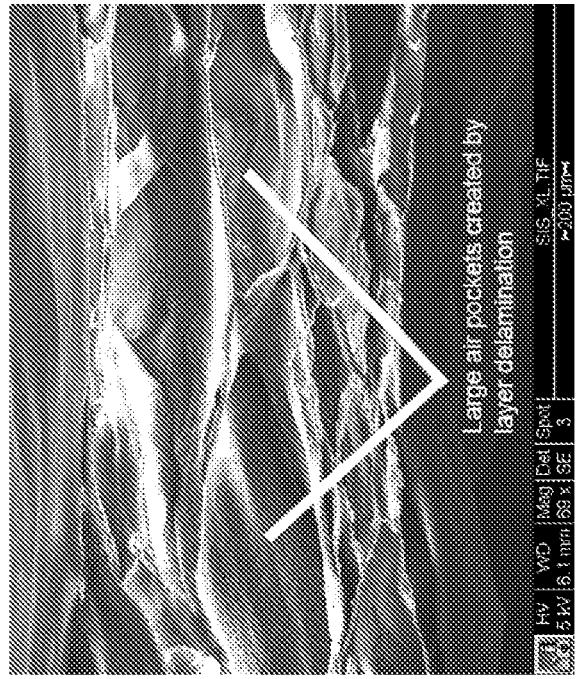
FIG. 5 is a scanning electron micrograph cellular polymeric multilayered thin film made according to the method of FIG. 3 showing a cross-section of a 6% relative density alternating multilayered COC/LDPE foam.

When a solid polymeric multilayered thin film is saturated, desorbed and subsequently heated, a cellular polymeric multilayered thin film is produced as shown in FIG. 5. According to FIG. 5, a different structure is apparent compared to the cellular structure of the monolayered thin film of FIG. 4. For example, in FIG. 5, large pockets (or cells) are present and are created by layer delamination between layers (interlayer) of the different polymeric layers, as opposed to cell creation intralayer of a monolayer thin film. However, in some instances, cells, both microcellular and nanocellular cells are created within individual layers (intralayer) as well as between layers (interlayer) of the multilayered thin films. It can therefore, also be possible to create thin films that have a surface exterior that is substantially the same thickness as the cell wall thickness in the interior.

Solid polymeric mono or multilayered thin films grow in the thickness direction, thus rendering them useful for continuous production. A useful characteristic of cellular thin films that are created from initially solid thin films in the range of 0.01 mm to 0.25 mm is the ability of the cellular polymeric mono or multilayered thin films to flex or be flexible. Flexible as used herein means at least being able to cantilever under the weight of the material when one end of the material is rigidly and horizontally held.

The following example demonstrates the creation of flexible and cellular polymeric thin films made from solid polymeric thin films having an initial thickness of 0.06 mm to 0.12 mm.

Example 1

Monolayer PLA Film

A monolayer thin film of PLA known by the designation as NatureWorks LLC 4042D with a thickness of 0.05 mm (2 mils) provided by Printpack Inc. This grade of PLA has a density of 1.24 g/cc and a glass transition temperature ($T_g$) of 13° C. (275° F.).

Multilayered COC/LDPE Film

A multilayer thin film having 29 alternating layers made using a modular disk coextrusion die as disclosed in U.S. Pat. Nos. 5,762,971 and 6,000,926 was obtained from BBS Corporation. For this experiment, the 29 layer alternating film has outer layers of EMA Exxon 12 surrounding 27 alternating layers of COC and LDPE. The total thickness of the film was 0.10 mm (3.94 mils).

The outer layers of EMA were extrusion grade Exxon OPTEMA EMA TC 120. This material has a reported melting temperature at 77° C. (171° F.) and a softening point at 48° C. (119° F.). The extrusion grade COC 8007 was manufactured by TOPAS Advanced Polymers and has a density of 1.020 g/cc and a $T_g$ of 78° C. (172° C.). The DOW polyethylene 4012 has a density of 0.9180 g/cc and a melting point of 107° C. (22° F.) and a softening point of 89° C. (192° F.). The $T_g$ of LDPE is known to be well below ambient temperatures in the range −100 to −130° C.

Solid-State Processing

For the gas sorption experiments, thin film specimens were placed in a 63 mm (2.48 in) diameter and 51 mm (1.01 in) deep pressure vessel. The saturation pressure within the vessel was regulated by an OMEGA CN8500 process controller with a resolution of ±0.01 MPa. A Mettler-Toledo AE240 precision balance with an accuracy of 100 μg was used to measure the gas solubility of the films. $CO_2$ gas saturation pressures of 1 and 3 MPa were analyzed for PLA at room temperature (20° C./68° F.). Due to short saturation times for PLA at 3 MPa (700 psi), a new specimen was used for each solubility measurement. Since gas sorption at 1 MPa took significantly more time, the same sample was saturated and removed periodically for solubility measurements. The solubility of COC/LDPE specimens was measured for a 5 MPa (700 psi) saturation pressure at room temperature (20° C./68° F.), using the same specimens for each successive solubility measurement reading. Once full saturation was achieved, each sample was removed from the vessel and allowed to desorb at atmospheric pressure and room temperature. Periodic mass measurements were recorded by the same Mettler-Toledo scale used for solubility measurements.

Foaming experiments were conducted using a Techne TE-10D Tempette bath circulator with a water temperature stability of ±0.01° C. Samples were unconstrained during this process, but held underwater for 15 seconds. For a given foaming temperature, 3 MPa PLA specimens were saturated and foamed in the water bath individually. 1 MPa PLA samples were batched together in one pressure vessel but foamed one by one while maintaining the pressure of the other specimens. COC/LDPE was saturated at 5 MPa individually and foamed in the water bath for each foaming temperature. Desorption time was kept constant at 30 seconds. Relative density was measured using the wet and dry mass as specified by ASTM D792. Microstructure was studied using images taken from an FEI Sirion XL 30 SEM at the UW Nanotech User Facility.

A separate experiment was designed to examine the effect of desorption time on relative density for a given set of processing conditions. A batch of PLA specimens were saturated at 3 MPa for 3 minutes before being removed together. A specimen was foamed at 80° C. one at a time, with each successive specimen allowed to desorb an additional 30 seconds.

Results and Discussion

PLA Films

Figure 6:
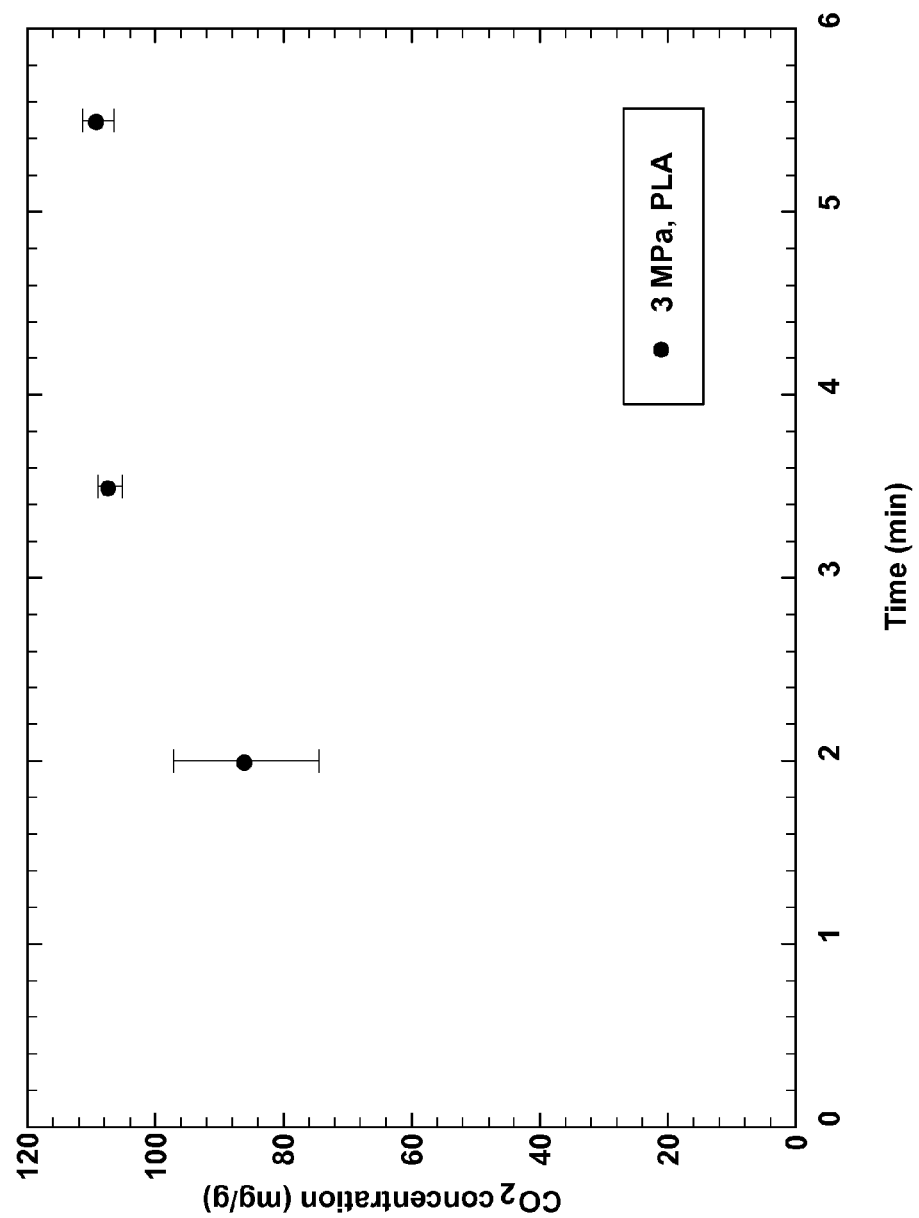
FIG. 6 is a graph showing $CO_2$ concentration (m/g) versus time (min) of PLA sorption at 3 MPa saturation pressure and room temperature.
Figure 7:
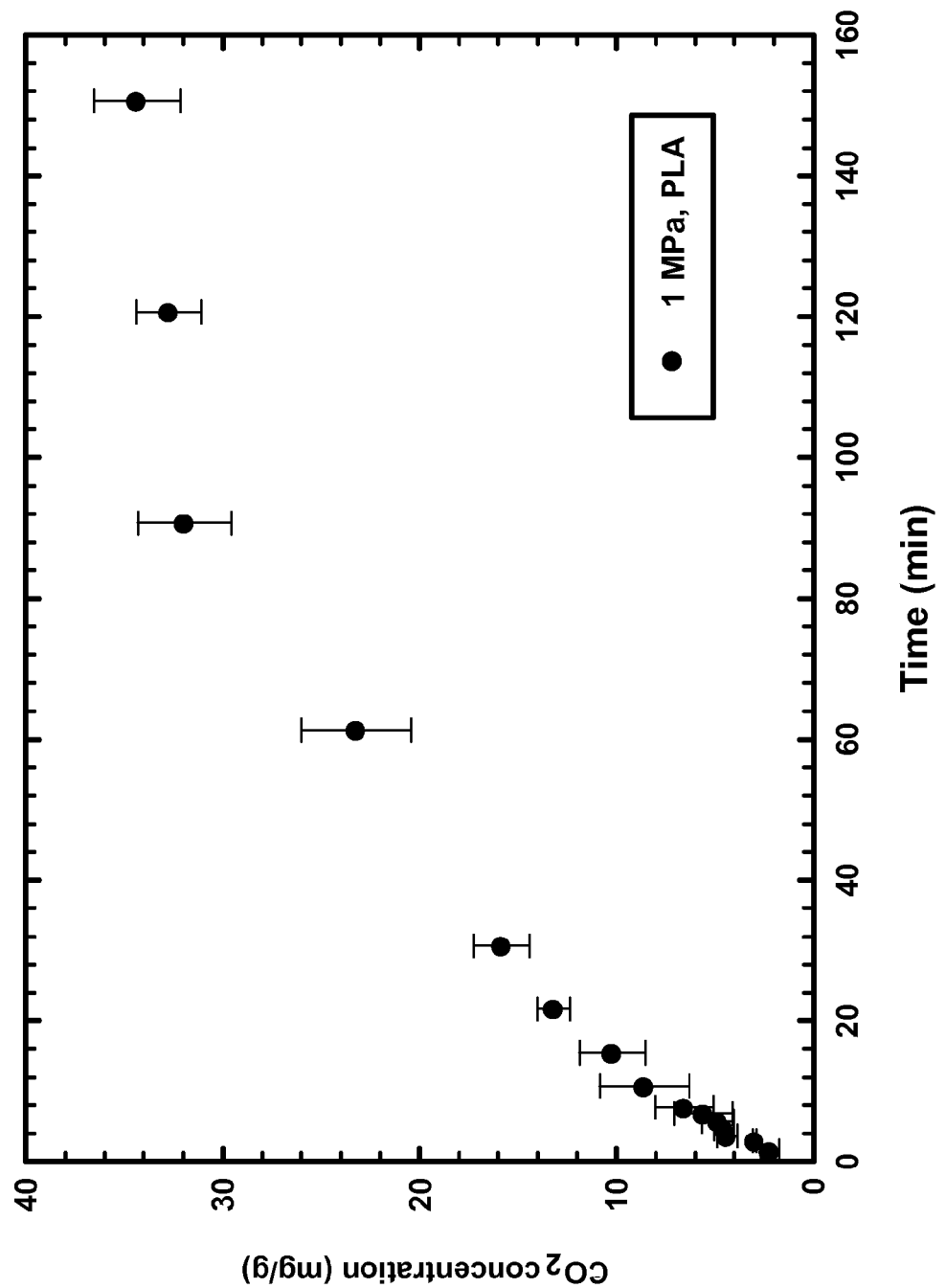
FIG. 7 is a graph of $CO_2$ concentration (m/g) versus time (min) of PLA sorption at 1 MPa saturation pressure and room temperature.

Obtaining sorption data is useful to understanding the compatibility of a material to solid-state processing and producing consistent microcellular foams. Due to the small thickness of the PLA films, more scatter was observed in the sorption data. For these thicknesses, desorption time between opening the pressure vessel and taking measurements becomes very crucial to obtaining accurate data. As shown in FIG. 6, 3 MPa PLA samples reached equilibrium concentration of 109 mg/g of $CO_2$ in under 4 minutes, where 30 seconds was the average desorption time before a measurement was taken. The 30 second desorption time produced larger errors at lower saturation time measurements. PLA saturated at 1 MPa was found to reach an equilibrium concentration of 33 mg/g $CO_2$ in 130 minutes, which is shown in FIG. 7. The same samples were used for multiple solubility measurements, which introduces an error due to repeated pressurizing and depressurizing of the pressure vessel.

Figure 9:
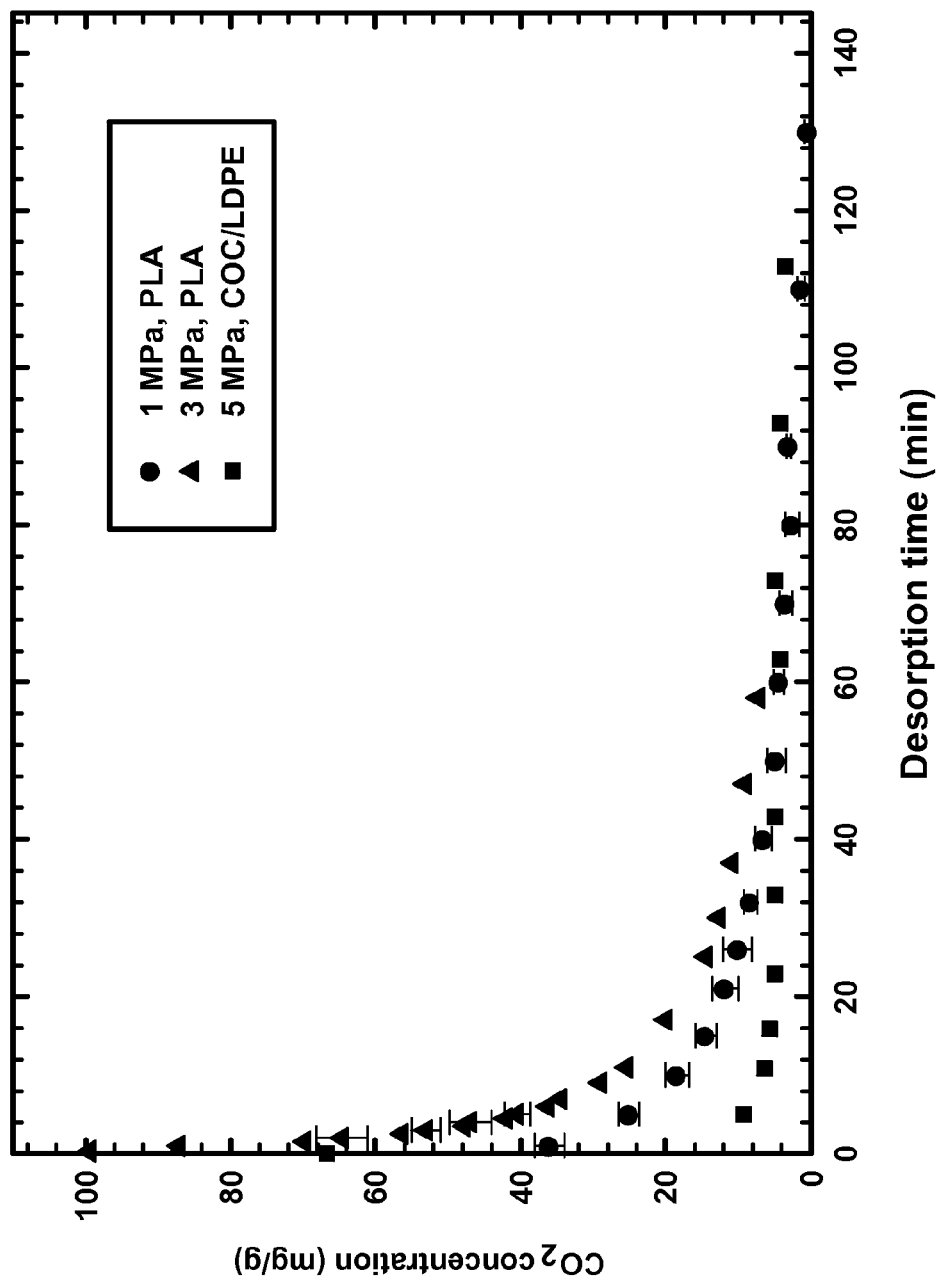
FIG. 9 is a graph of $CO_2$ concentration (milligrams per gram) versus desorption time (min) for desorption of PLA (1 and 3 MPa) and COC/LDPE (5 MPa) and room temperature.

Characterizing desorption is useful to the feasibility of the solid-state processing of thin films. Since the technique requires ample amounts of gas as the nucleating agent, desorption data would define the processing window. PLA specimens were saturated at 1 MPa for 3 hours and 3 MPa for 3 minutes in the same processing conditions as the sorption experiments. FIG. 9 shows both 1 and 3 MPa saturation conditions lost $CO_2$ gas very quickly. In a matter of 10 and 5 minutes, respectively, the specimens lost half the amount compared at equilibrium concentration. Therefore, the processing window for films is limited and heavily dependent on desorption time.

Figure 10:
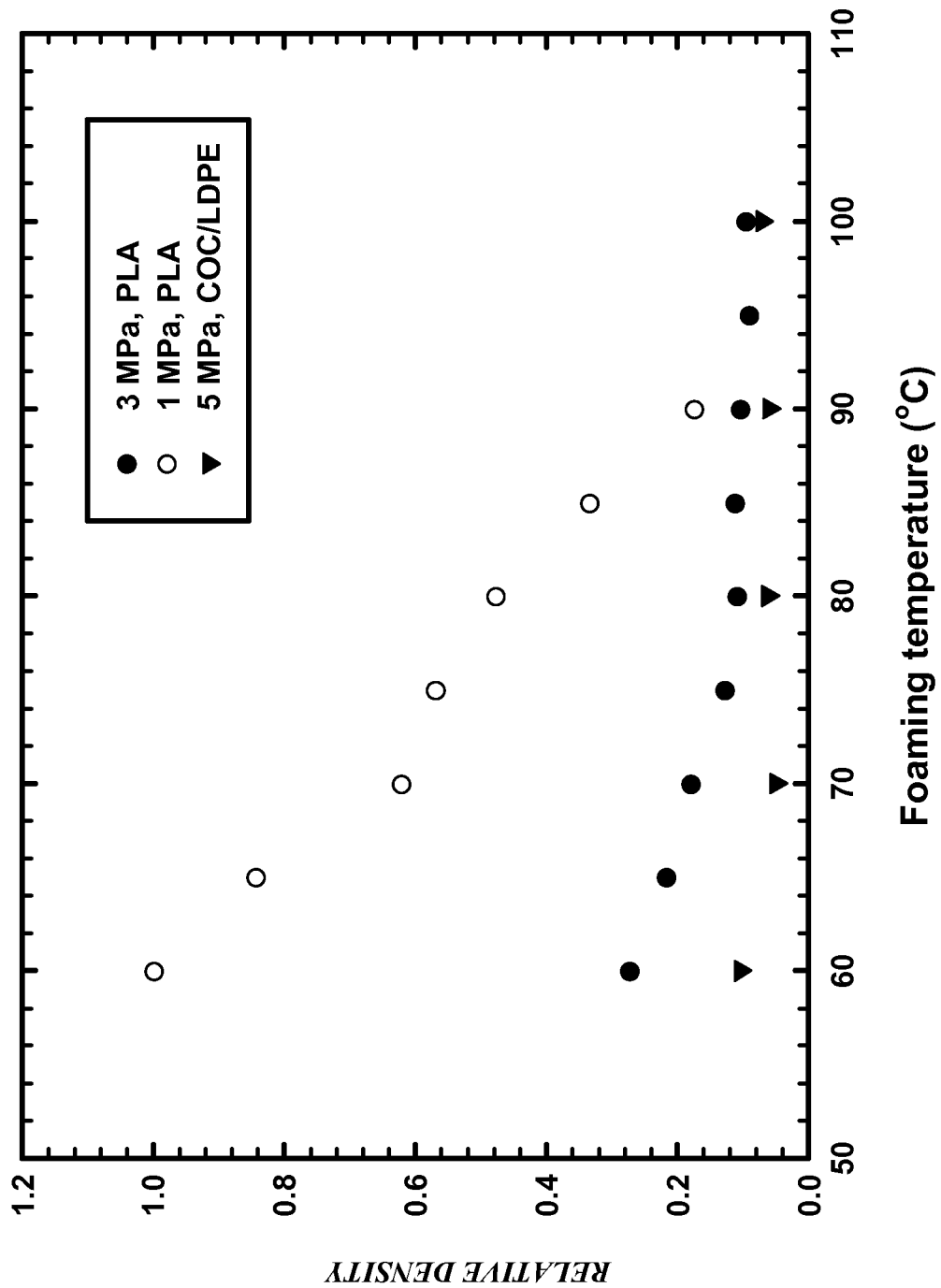
FIG. 10 is a graph of relative density versus foaming temperature (° C.) for relative densities as a function for foaming temperature for 1 and 3 MPa saturated PLA film and 5 MPa COC/LDPE film.

FIG. 10 shows that low relative densities were achieved at both 1 and 3 MPa saturation times, despite the limited processing window. A relative density of 8.8% was achieved at a saturation pressure of 3 MPa and foaming temperature of 95° C. With a saturation time of 3 min, the range of achievable relative densities between 60 and 100° C. was 27% to 8.8%. The relative density is relatively constant between 80° C. and 100° C. The 1 MPa saturated PLA film has a wider range of relative densities of 17 to 99.7% for foaming temperatures between 60° C. and 80° C. The relative density for a sample at a given foaming temperature is much higher for 1 MPa than 3 MPa. For 1 MPa, the relative density decreases sharply as foaming temperature increases, but does not quite reduce below 17%.

Figure 11:
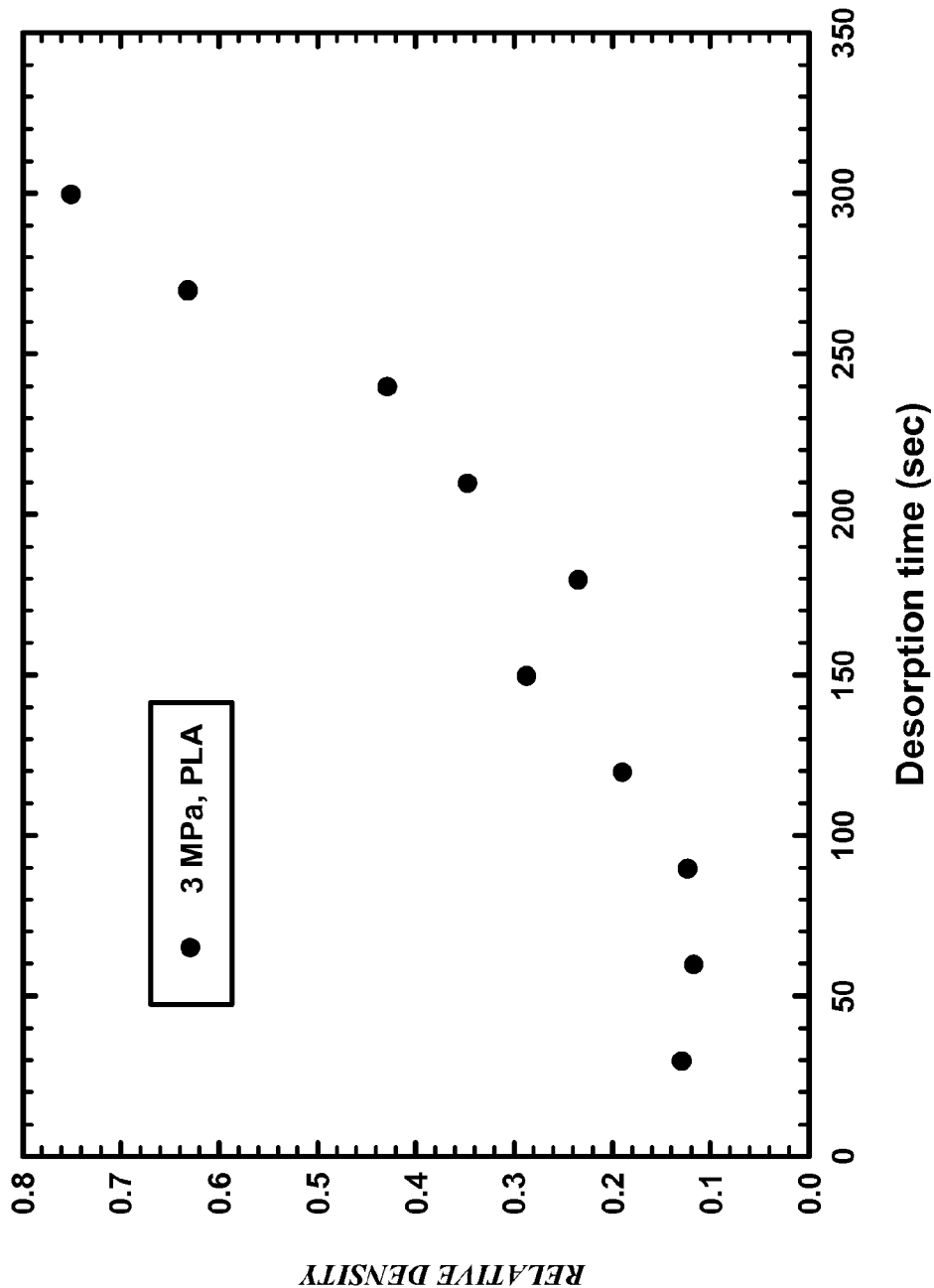
FIG. 11 is a graph of relative density versus desorption time (sec) for 3 MPa PLA with varying desorption time at 80° C. foaming temperature.

A wide range of relative densities were observed by adjusting the desorption time of a specimen while maintaining all other processing conditions. 3 MPa saturated PLA was foamed at 80° C. for desorption times ranging 30 and 300 seconds. FIG. 11 shows expected relative densities of 11% for the first 90 seconds of desorption at 80° C. But beyond a 90 second desorption time at 80° C., the relative density begins to increase. At a desorption time of 210 and 300 seconds, the achievable relative density was 35% and 75%, respectively. By simply varying desorption time over a period of 5 minutes, relative densities ranging from 11% to 75% was achieved. The desorption rate provides a new variable to control relative density not usually considered for thicker sheets.

Figure 12:
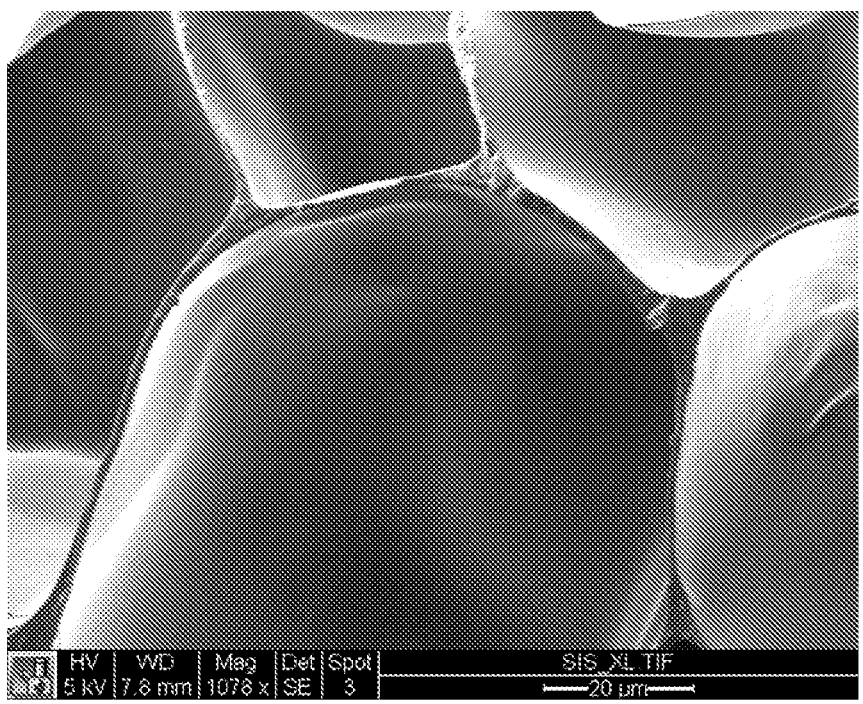
FIG. 12 is a scanning electron micrograph of a close-up cross-sectional view of the cell wall thickness of the structure of FIG. 5.

The foaming reaction occurs rapidly, usually causing the specimen to wrinkle. Specimen's had a tendency to expand then collapse. It is clear that the samples expanded from its original size. At times, the sample would fold in on itself, causing the specimen to bond to itself at elevated foaming temperatures. Foaming causes PLA to turn a white color, although not completely opaque. FIG. 4 shows an even distribution of closed cells with sizes ranging from about 50 to about 100 µm. FIG. 4 also shows the surface texture is bumpy and rough in comparison to the virgin material and that the surface thickness is approximately the same thickness as the cell walls in the interior. FIG. 12 shows the cell wall thickness is about 2 µm.

Multilayered Films

Figure 8:
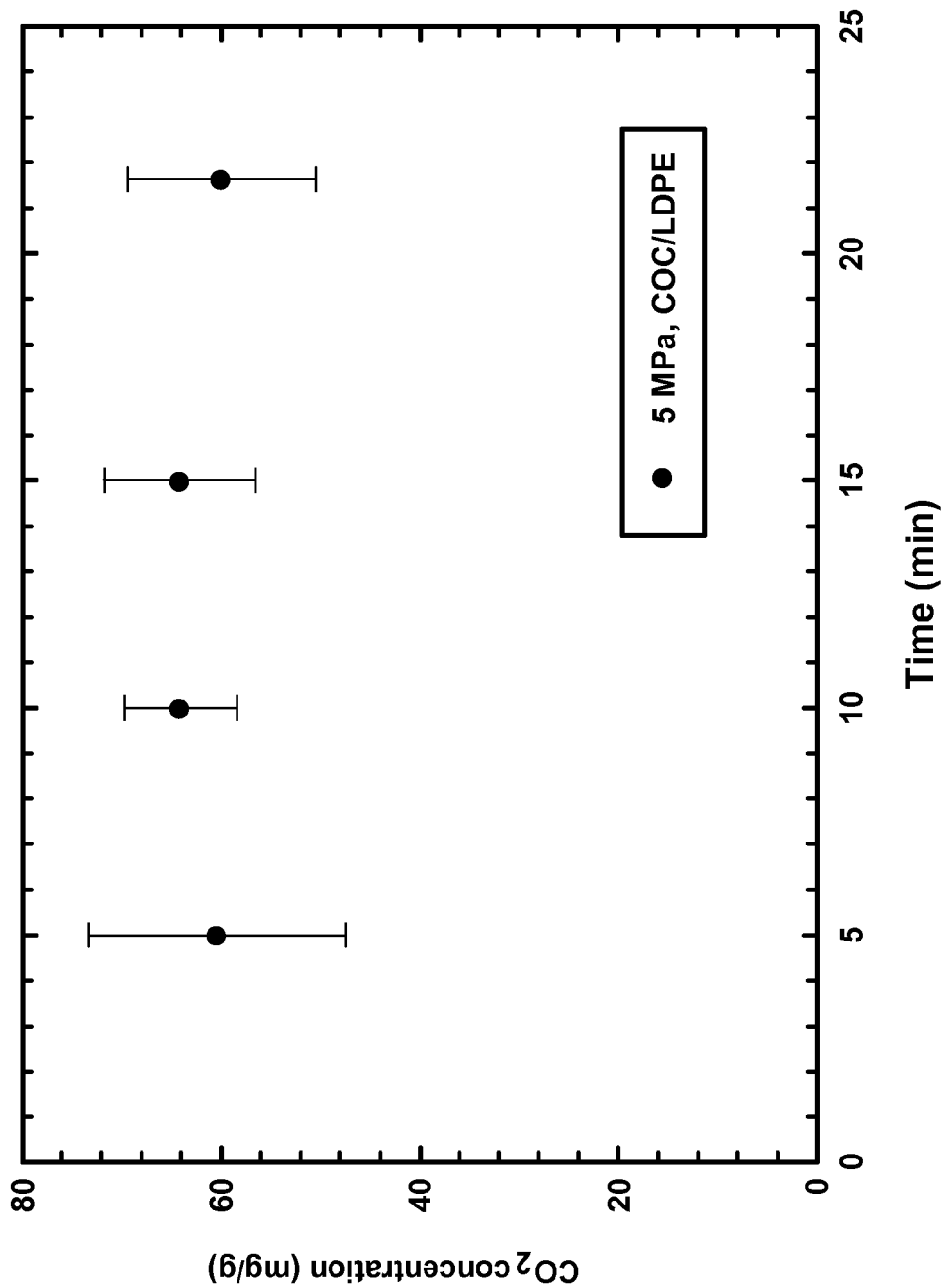
FIG. 8 is a graph of $CO_2$ concentration (m/g) versus time (min) for COC/LDPE film sorption at 5 MPa saturation pressure and room temperature.

As shown in FIG. 8, the equilibrium gas concentration of the multilayered film reaches 60 mg/g in 10 minutes. There is a degree of scatter in the data due to different challenges in addition to desorption time. Samples had a tendency to delaminate between layers, causing macro-sized bubbles to form after depressurization. This phenomenon is enhanced when the sample is exposed to warmer temperatures (i.e. warmth of hand touching the sample) that can be seen and felt. It is possible that the formation of these delamination sites causes some gas to escape.

Additional delamination sites appear the longer a sample is left out of the pressure vessel. The formation of one bubble causes the formation of a neighboring one. FIG. 9 shows the gas concentration drops by 85% in the first 5 minutes of desorption. This is expected considering the high saturation pressure used and the thickness of the specimen. The window to foam the multilayered film is within 5 minutes of depressurization.

The relative densities achieved at a 5 MPa saturation pressure fall between 5 and 10%, as shown in FIG. 10. The reduction in density is caused mostly by the macro-sized delaminations occurring at the adhesion interface between different materials within the film. Because the film is made of alternating layers of different materials, the boundary between each layer has different properties than either of the solid materials. This interface depends on the attraction between the two types of materials. The distribution of macro-bubbles is very uniform.

The specimens grew in thickness while the area slightly decreases. The reduction in density is caused by delamination and not the nucleation of bubbles within each layer of the film. The area is expected to decrease to accommodate the increase in thickness. However, the increase in thickness is much greater than the loss in area. The hazy but transparent appearance of the virgin material turns white after foaming. The microstructure, as seen in FIG. 5, shows large pockets that formed between delaminated layers. No bubble nucleation was found within individual layers within the film.

CONCLUSION

The time to saturate thin films is of the order of 10 to 100 minutes caused by rapid loss of gas. PLA film can be reduced to as low as 11% relative density. Desorption plays a major role in successfully foaming thin films. PLA films should be processed within 4 minutes of depressurization. Applying the solid-state process to multilayered films created a 90% reduction in density. The reduction is caused largely by the formation of delaminations or macro-bubbles between individual layers in the film.

Example 2

Materials

Four different polymeric monolayered materials were investigated for this example. The materials included poly (lactic acid) (PLA), cyclic olefin copolymer (COC), polycarbonate (PC) and polyetherimide (PEI). A summary of the properties of the materials used is provided in Table 1.

TABLE 1

| Material Properties of Thin Films Studied | | | |
| --- | --- | --- | --- |
| Material | Original thickness (mm) | Density (g/cc) | Glass transition temperature (° C.) |
| PLA | 0.05 | 1.24 | 60 |
| COC | 0.05 | 1.02 | 78 |
| PC | 0.12 | 1.2 | 150 |
| PEI | 0.07 | 1.27 | 215 |

Basic Processing and Equipment

Gas saturation of the thin film specimens took place in a 63 mm diameter and 51 mm deep steel pressure vessel. The blowing agent was 99.9% pure $CO_2$ gas supplied by Airgas Norpac delivered form highly pressurized cylinders. The saturation pressure within this system was regulated by an OMEGA CN8500 process controller with a resolution of ±0.01 MPa. A Mettler-Toledo AE240 precision balance with an accuracy of 100 μg was used to measure the gas solubility of the films.

Structure/SEM

The microstructure of the sample was investigated using a Sirion SEM located at the University of Washington Nanotech User Facility. Cell size, skin thickness and other micro-sized features were measured from these micrographs using the software MeasureIT.

Results and Discussion

Gas Sorption and Desorption

Characterizing the gas sorption and desorption behavior of a polymer provides information in understanding the processing window and limitations of foaming a thin film.

Sorption Data

Gas solubility behavior depends on both the polymer and thickness. The gas solubility results for each material followed a trend for a polymer-gas system. The polymer gained gas at a faster rate initially, but slowly begins to level off until it reaches a steady state.

Figure 13:
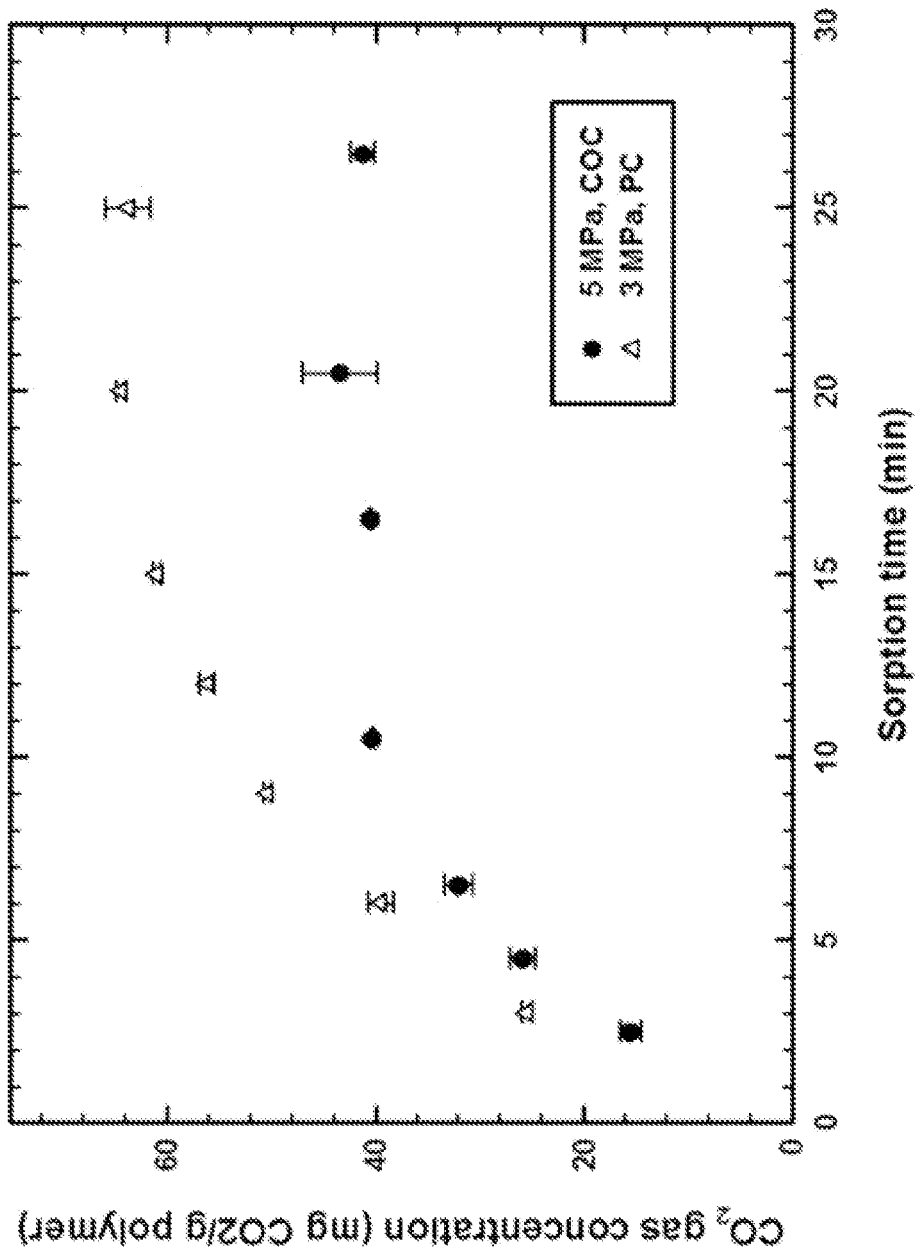
FIG. 13 is a graph of sorption time in minutes versus carbon dioxide gas concentration (mg $CO_2$/g polymer) for 0.05 mm thick COC at 5 MPa and room temperature and 0.12 mm thick PC at 3 MPa and room temperature.
Figure 14:
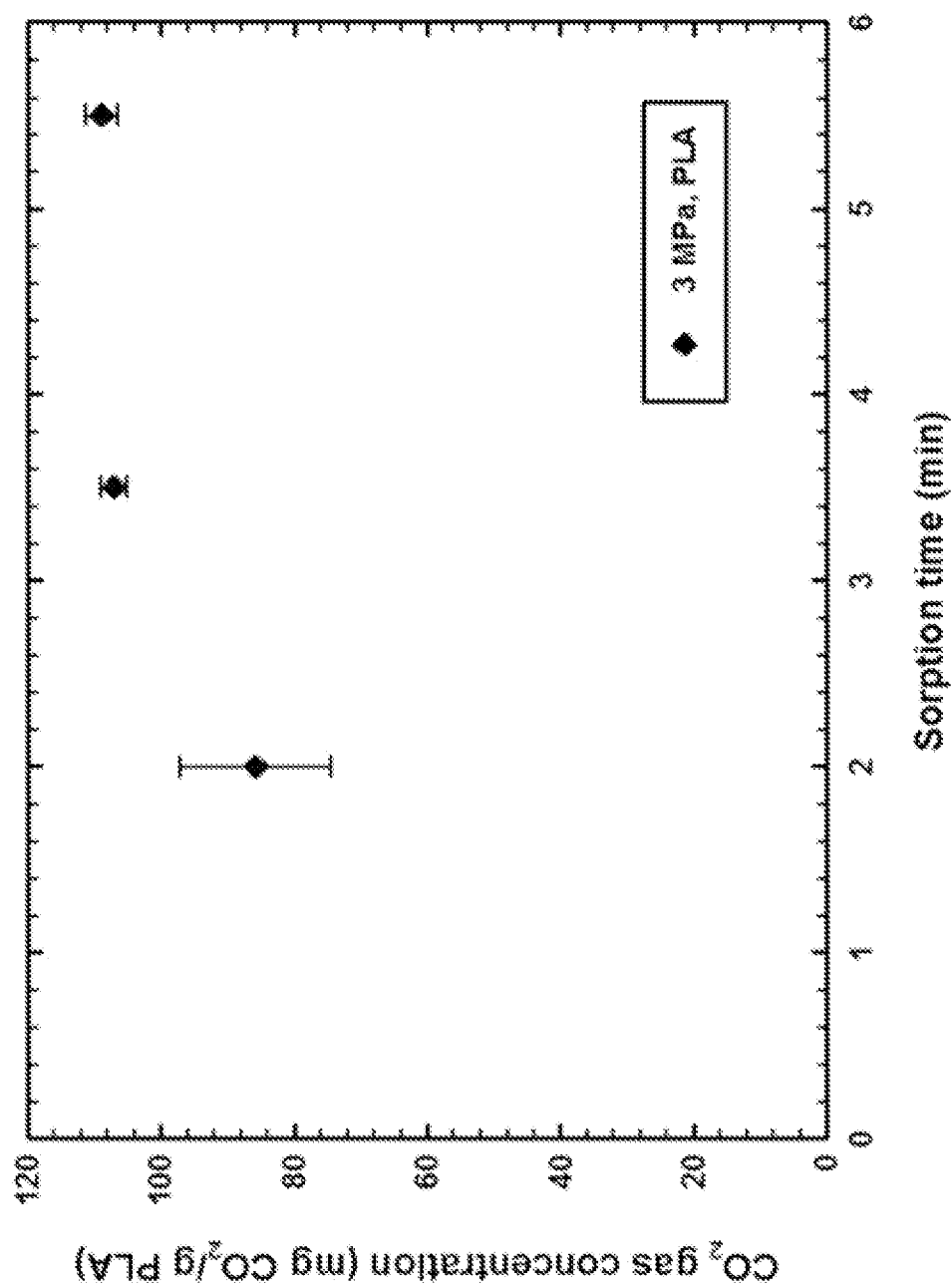
FIG. 14 is a graph of sorption time in minutes versus carbon dioxide gas concentration (mg $CO_2$/g polymer) for 0.05 mm thick PLA at 3 MPa and room temperature.
Figure 15:
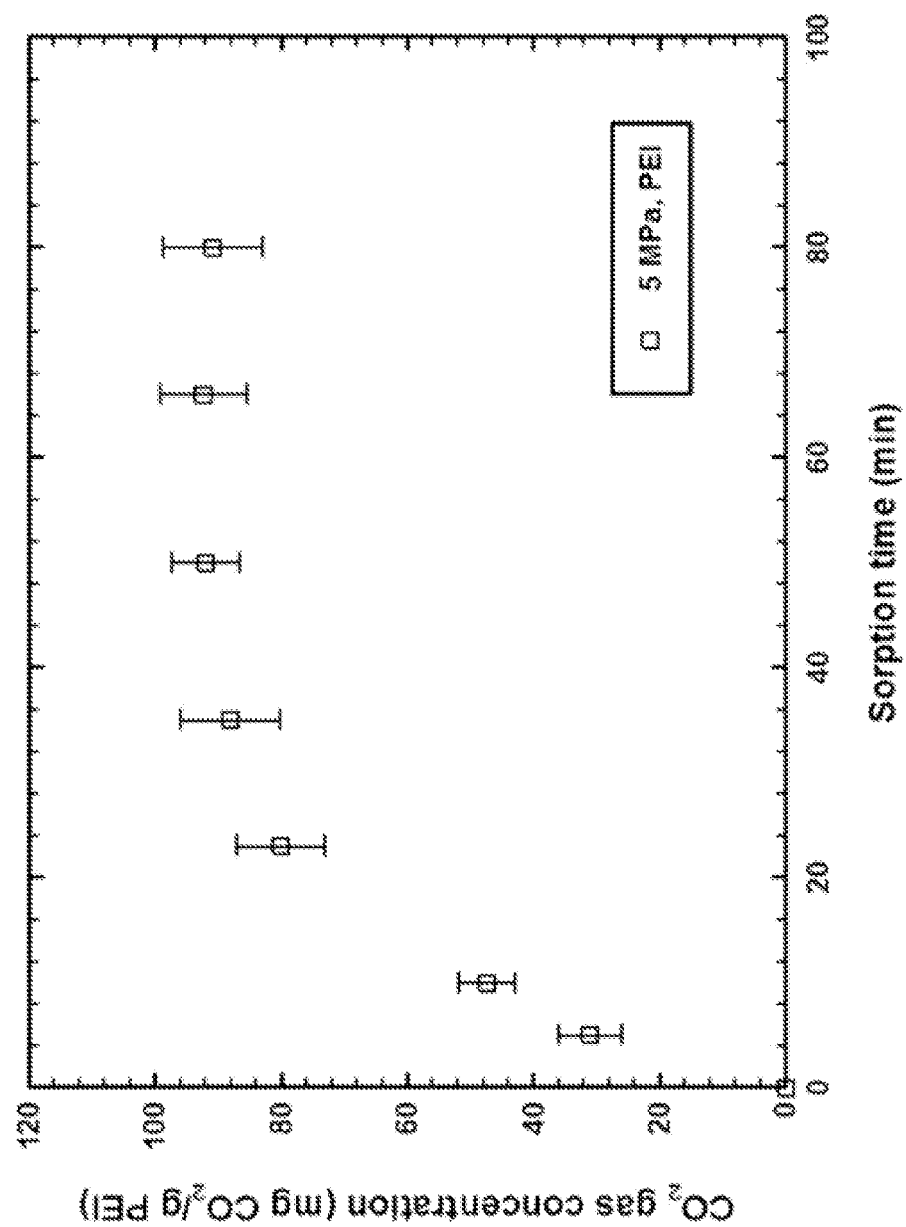
FIG. 15 is a graph of sorption time in minutes versus carbon dioxide gas concentration (mg $CO_2$/g polymer) for 0.07 mm thick PEI at 5 MPa and room temperature.

Due to the small thickness, the time to reach equilibrium gas concentration was very quick. For PLA, only three minutes of saturation was needed to reach 110 mg of $CO_2$/g of PLA. PEI absorbs gas slower, taking about 40 minutes to reach equilibrium gas concentration. The saturation state is usually the longest stage in the solid-state process, but the small sample thickness in these experiments decreases saturation time significantly. FIGS. 13 through 15 provide the sorption time versus gas concentration profiles for COC, PC, PLA and PEI. Table 2 provides the equilibrium gas saturation time and concentration for a given pressure.

TABLE 2

Thin film equilibrium gas concentration at room temperature

| Material | Saturation pressure (MPa) | Equilibrium saturation time (min) | Equilibrium $CO_2$ gas concentration (mg of $CO_2$/ g of polymer) |
| --- | --- | --- | --- |
| PLA | 3 | 3 | 109 |
| COC | 5 | 15 | 40 |
| PC | 3 | 20 | 65 |
| PEI | 5 | 45 | 90 |

Desorption Data

Figure 16:
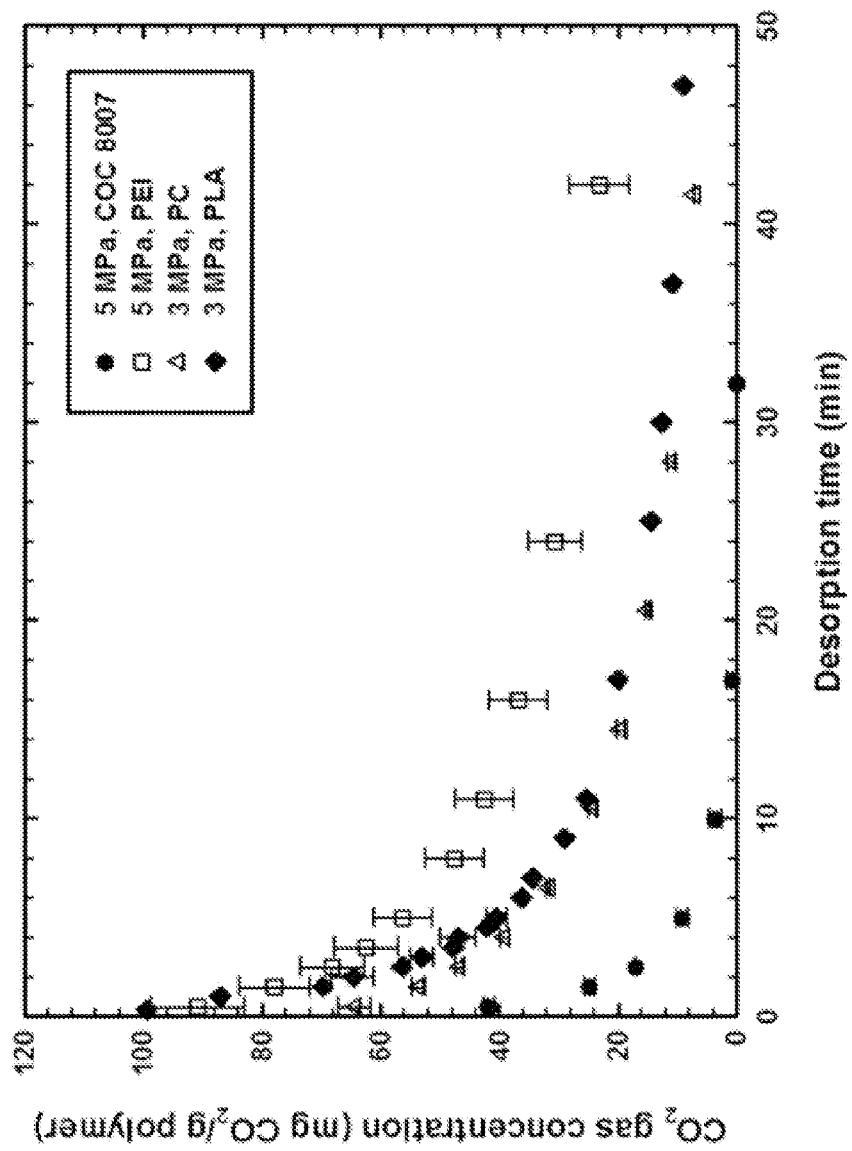
FIG. 16 is a graph of desorption time in minutes versus carbon dioxide gas concentration (mg $CO_2$/g polymer) for PLA, COC, PC, and PEI.
Figure 17:
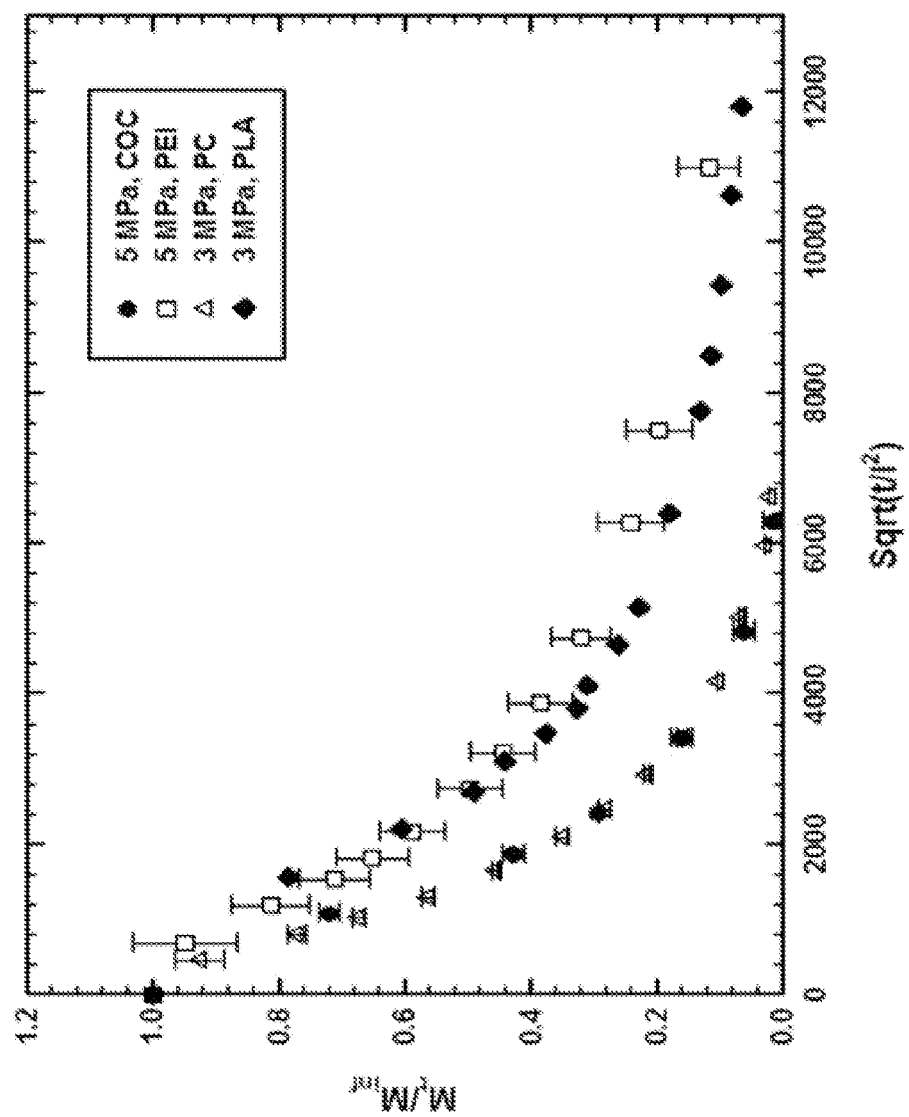
FIG. 17 is a graph of the carbon dioxide desorption curves of FIG. 16 normalized for gas concentration and thickness.

Desorption time was studied carefully to understand the processing window for microcellular thin films. Gas desorbs at a faster rate initially, but as the content decreases, so does the diffusion rate. This behavior is typical of most polymers studied for microcellular plastics. FIGS. 16 and 17 show the absolute and normalized gas desorption behavior of the thin films studied.

The FIGURES show that gas desorbs very quickly. The desorption time provides the information in maintaining enough gas to foam.

Production of Microcellular Films

Microcellular films were produced in two different ways. The first method fixed most processing parameters but varied foaming temperature as a means of controlling the results. The second method fixed most processing parameters but varied desorption time to adjust the gas concentration to achieve different structures.

Foaming Temperature Method

Samples were saturated at a specific pressure until full saturation. They were then foamed at various foaming temperatures to achieve different relative densities. Desorption time was fixed as much as possible, however deviations in equipment made it difficult to maintain exact desorption times. Table 3 shows the processing conditions for this experiment.

TABLE 3

Summary of thin film foam processing conditions by varying foaming temperature

| Material | Saturation pressure (MPa) | Saturation time (min) | Foaming temperature range (° C.) | Desorption time (sec) | Foaming time (sec) |
| --- | --- | --- | --- | --- | --- |
| PLA | 3 | 3 | 60 to 100 | 30 | 10 |
| COC | 5 | 15 | 60 to 150 | 33 to 38 | 10 |
| PC | 3 | 25 to 88 | 80 to 160 | 31 to 48 | 20 |
| PEI | 5 | 50 to 172 | 100 to 220 | 30 to 48 | 30 |

Figure 18:
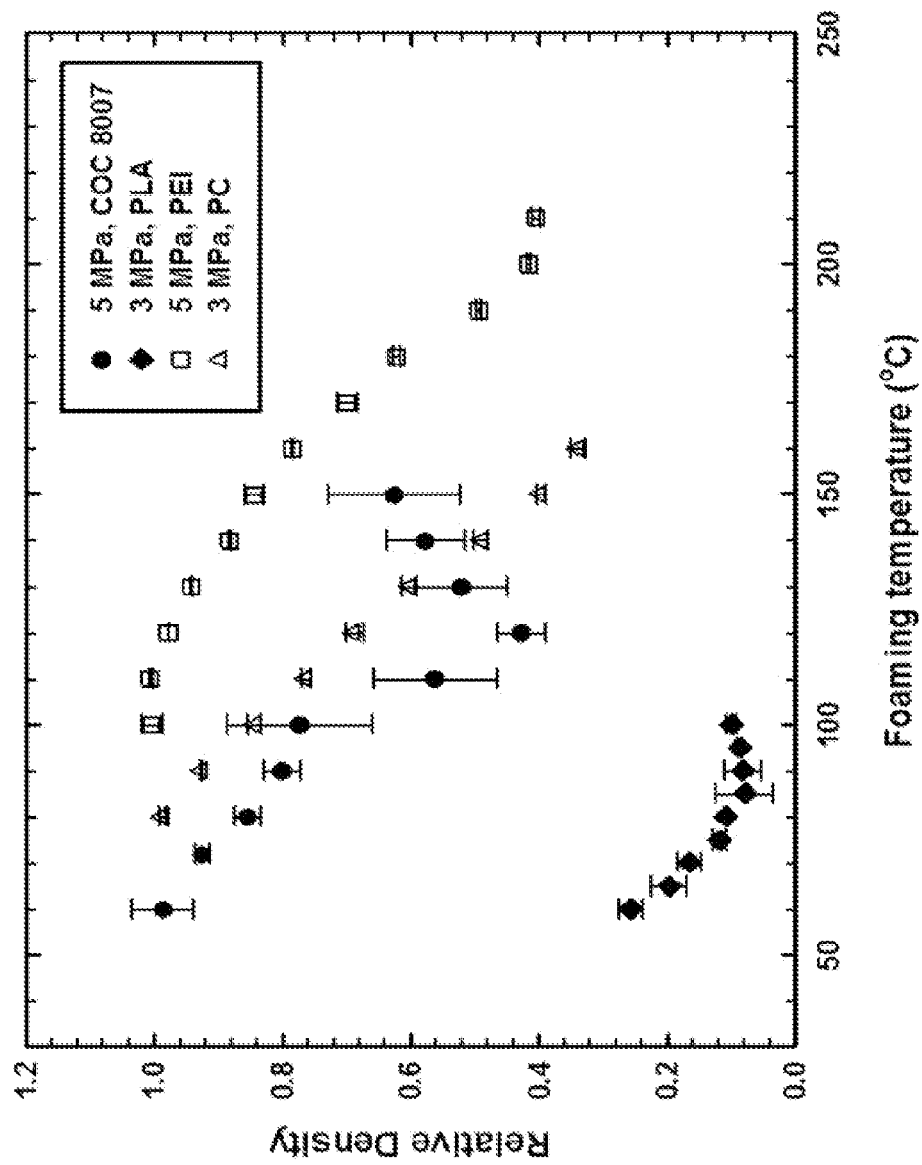
FIG. 18 is a graph summarizing the foamed relative densities of COC, PLA, PEI, and PC as a function of foaming temperature.

FIG. 18 shows the range of relative densities achieved as a function of foaming temperature. The lowest density achieved was in PLA, reaching a relative density of 5%. Of the foaming temperatures studied for PLA, sample density reduced significantly, creating larger and thicker foamed samples. The range of relative densities achieved for PC and PEI were similar, ranging between unfoamed at 35%. COC produced a wide range of relative densities, but the errors in producing consistent foams were larger than the other materials.

Desorption Time Method

The desorption stage is known for controlling the skin thickness of thicker polymer sheets. For thin films, gas concentration varies greatly for small increments of desorption time. This behavior provides a means to achieve different relative densities by controlling the gas concentrations of a sample. Table 4 provides a summary of thin film foam processing conditions by varying desorption time.

TABLE 4

Summary of thin film foam processing conditions by varying desorption time

| Material | Saturation time (min) | Saturation pressure (MPa) | Foaming temperature (° C.) | Foaming time (sec) |
| --- | --- | --- | --- | --- |
| PLA | 3 | 3 | 90 | 10 |
| COC | 15 | 5 | 120 | 10 |
| PC | 25 | 3 | 150 | 20 |
| PEI | 143 | 5 | 190 | 30 |

Figure 19:
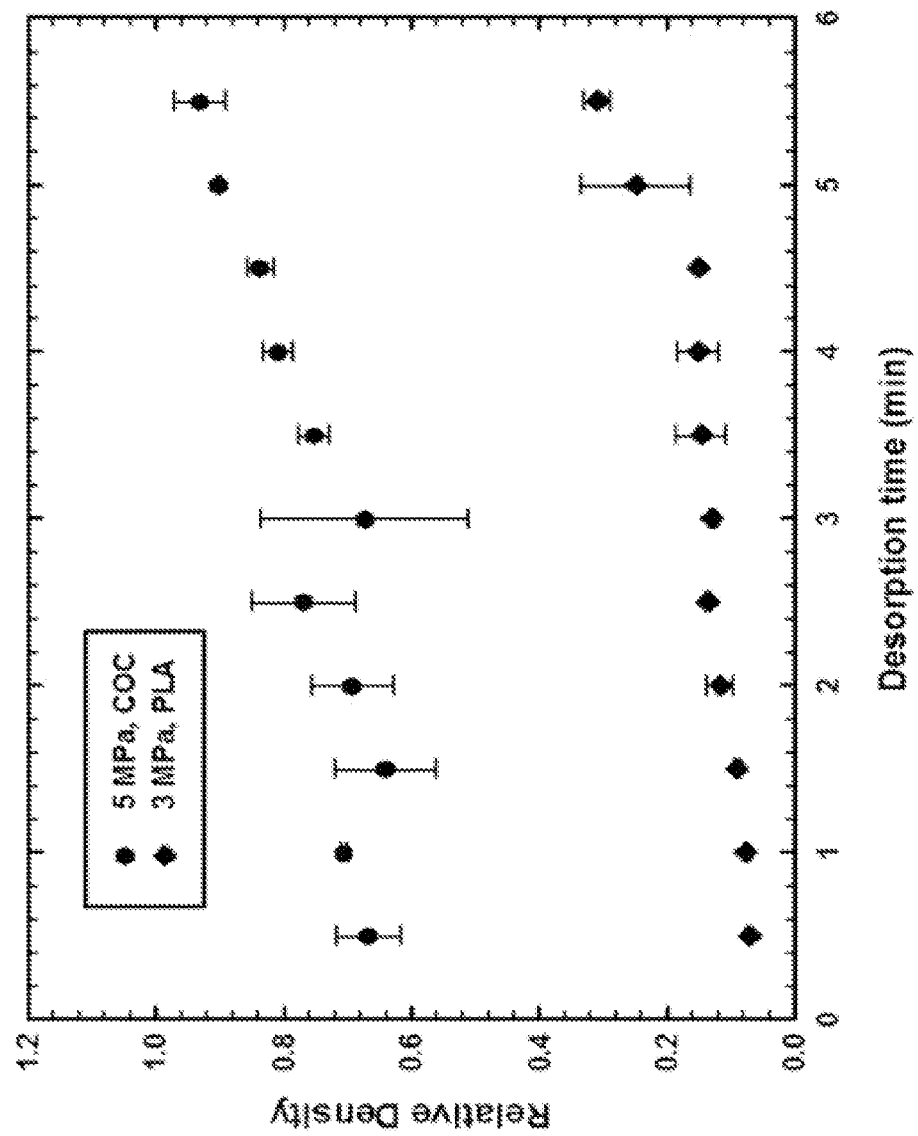
FIG. 19 is a graph of desorption time in minutes versus relative density for COC and PLA at room temperature.
Figure 20:
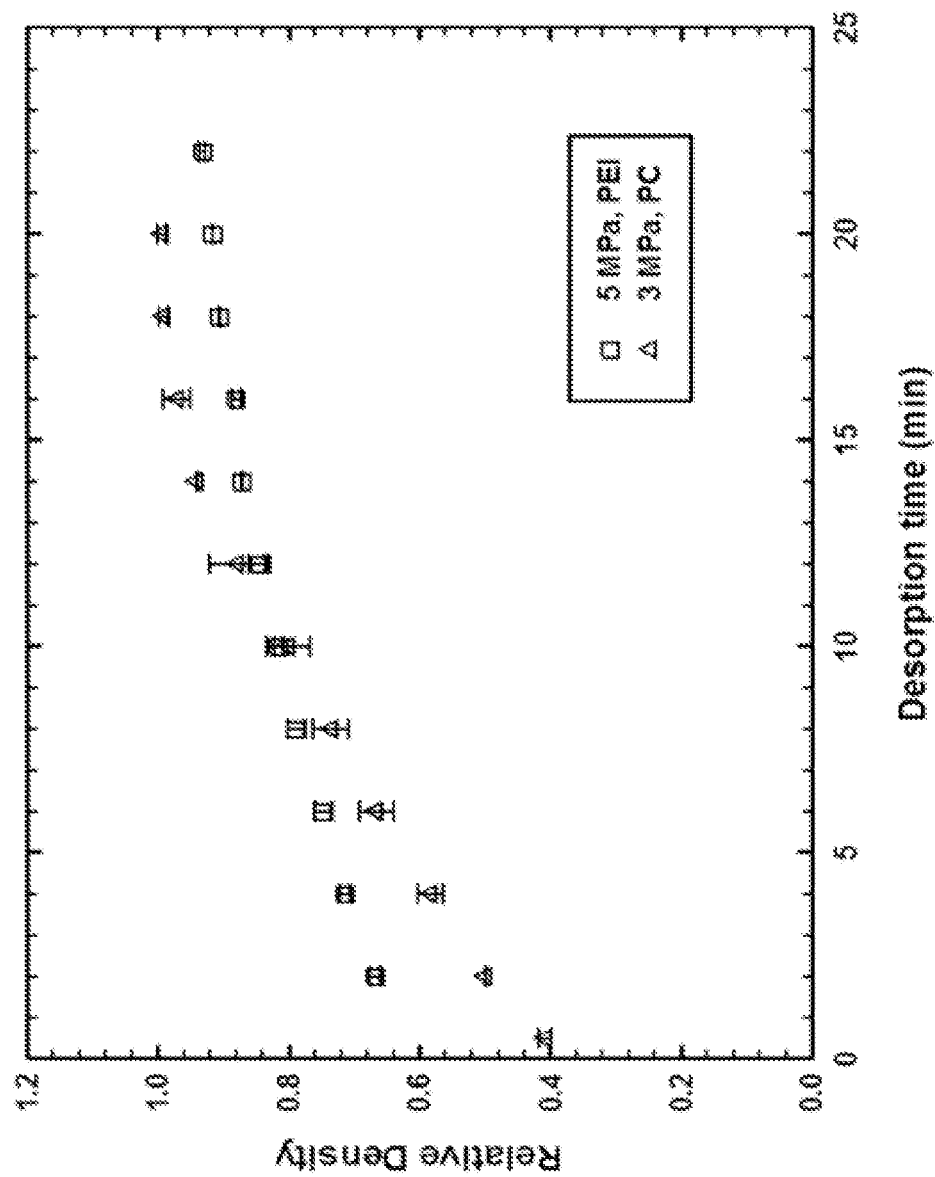
FIG. 20 is a graph of desorption time in minutes versus relative density for PEI and PC at room temperature.
Figure 21:
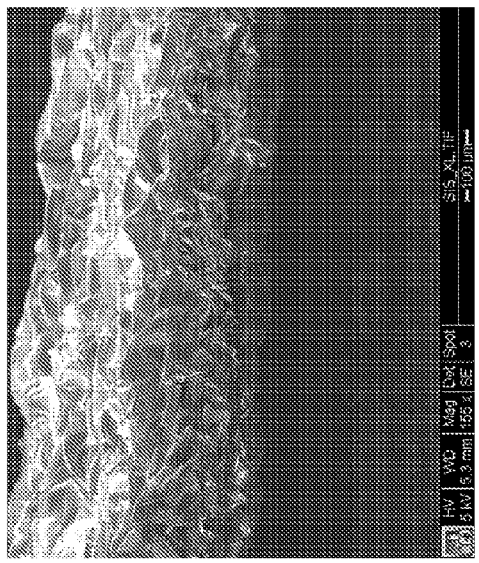
FIG. 21 is a scanning electron micrograph of a thin film PLA foam having a relative density of 11% (one cell thickness) made by the foaming temperature method.
Figure 22:
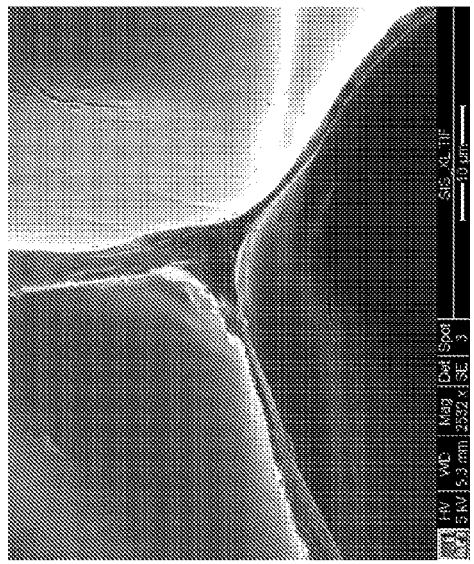
FIG. 22 is a scanning electron micrograph of a thin film PLA foam having a relative density of 6% (collapsed cells) made by the foaming temperature method.
Figure 23:
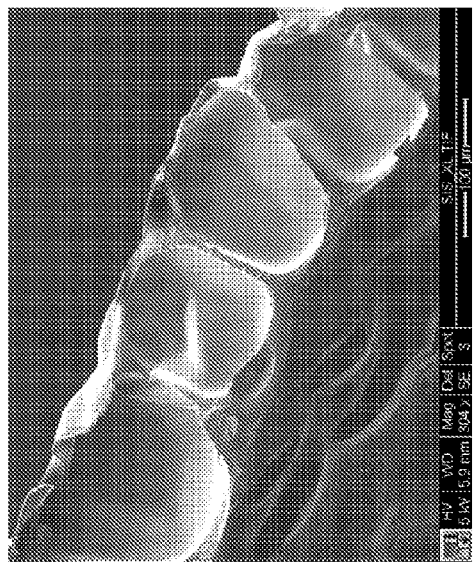
FIG. 23 is a scanning electron micrograph of a thin film PLA foam having a relative density of 6% (average 2 or 3 cell thickness) made by the foaming temperature method.
Figure 24:
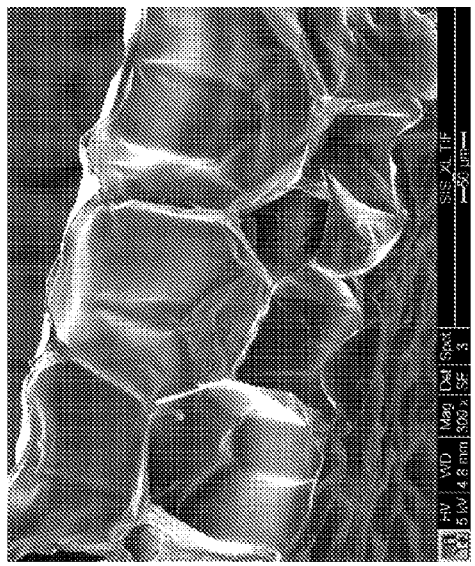
FIG. 24 is a scanning electron micrograph of a thin film PLA foam having a relative density of 8% made by the foaming temperature method.

FIGS. 19 and 20 shows the relative densities achieved as a function of desorption time. A wide range of relative densities were achieved by allowing samples to desorb between 1 and 20 minutes at a fixed foaming temperature.

This provides an alternative method to producing microcellular thin films. Other information that can be extracted from this example is whether there is a minimum gas concentration value from which a consistent relative density and structure can be foamed.

Window for Solid-State Processing
Average Diffusion Coefficient

The data collected from the sorption and desorption experiments can be used to determine the processing window of the thin films.

Table 5 shows the calculated average diffusion coefficient based off of the initial desorption slope.

TABLE 5

Calculated average diffusion coefficient of thin film COC, PEI, PC and PLA

| Material | Saturation Pressure (MPa) | Slope, R | Average diffusion coefficient ($cm^2/sec$) |
|---|---|---|---|
| COC | 5 | −3.0451E−04 | 1.8207E−08 |
| PEI | 5 | −2.0239E−04 | 8.0430E−09 |
| PC | 3 | −3.5110E−04 | 2.4205E−08 |
| PLA | 3 | −1.9905E−04 | 7.7798E−09 |

The average diffusion coefficient is used to understand the behavior of each polymer-gas system.

Microstructure

PC

The microstructure produced of microcellular PC thin films resembles that of thicker sheet (1-2 mm) PC. Cell sizes are small, ranging between 8 to 13 µm depending on the density achieved. Thus, 20 to 30 cells appear across the thickness of the film.

COC

COC microstructure was less controlled and more sporadic despite achieving a wide range of relative densities. The quality of foams produced was not consistent. Some distortion and wrinkling of the thin films is evident.

PLA

FIGS. 21 through 24 are electron scanning micrographs of thin film PLA foams having various densities. Microcellular PLA thin films had the largest cell sizes, ranging between 60 and 125 µm. The size of the nucleated cells exceeded that of the initial starting thickness of the sample. As a result, the foamed samples expanded in thickness in relation to the cell size, creating very thin cell walls and exterior "skin" thickness.

PEI

Thin film PEI foams have micro-sized cells with nano-sized cells in the walls of the micro-sized cells, or thin film PEI foams can have only nano-sized cells. In both cases thin film PEI foams have an integral skin. The structure is a combination of cells in the range of 1 µm with nano-size features contained in the cell walls. Another unique structure created consisted of purely nano-sized features. The sample resembled that of an open internal structure contained within a solid outer skin layer. In PEI, cells are of the order of 100 nm, or 0.1 micron, thus hundreds of cells may appear in the foamed thin film.

When allowed to desorb, a very distinct skin layer formed near the surface. The skin grew in thickness as gas was allowed to desorb for longer amount of time.

While illustrative embodiments have been illustrated and described, it will be appreciated that various changes can be made therein without departing from the spirit and scope of the invention.

The invention claimed is:

1. A microcellular thin film, comprising:
   a first exterior side separated from a second exterior side, the separation of which defines the thickness of the thin film;
   at least two or more layers, each layer is a monolithic thermoplastic polymeric material, wherein the two or more layers are laminated to form the thickness of the thin film, wherein each polymeric thermoplastic material layer comprises intralayer microcellular cells, wherein the intralayer microcellular cells are formed from interior cell walls and the intralayer microcellular cells are interior within the monolithic thermoplastic polymeric material, wherein each of the two or more layers of monolithic thermoplastic polymeric material is a 100% by weight thermoplastic polymeric material, and wherein the at least two or more layers comprise different thermoplastic polymeric materials;
   at least one of the first or second exterior sides of the thin film is formed of cell walls, wherein the cell walls at the exterior surface have substantially the same thickness as the interior cell walls of the intralayer microcellular cells; and
   wherein the thin film is on average two to three cells thick from the first exterior side to the second exterior side, and the cells are individually closed by the cell walls.

2. The microcellular thin film of claim 1, wherein the thin film is flexible.

3. The microcellular thin film of claim 1, comprising a relative density of 11% to 75%.

4. The microcellular thin film of claim 1, comprising a relative density of 5% to 27%.

5. The microcellular thin film of claim 1, comprising a relative density of 35% to 99%.

6. The microcellular thin film of claim 1, comprising a relative density of 44% to 99%.

7. The microcellular thin film of claim 1, comprising exterior surfaces having a thickness of about 2 µm.

8. The microcellular thin film of claim 1, wherein the at least two or more layers are selected from the group consisting of poly(lactic acid), an EMA polymer, polyethylene, ethylene vinyl acetate, low density polyethylene, methylacrylate, and a cyclic olefin copolymer.

9. The microcellular thin film of claim 1, wherein the cells have a size of 50 µm to 150 µm.

10. The microcellular thin film of claim 1, wherein the exterior surfaces comprise bumps formed by the cells.

11. A microcellular thin film, comprising:
    a first exterior side separated from a second exterior side, the separation of which defines the thickness of the thin film;
    a plurality of layers arranged along the thickness of the thin film, each layer having a first side and a second side, at least one side of each layer is laminated to one side of at least one other layer, wherein each layer is a 100% polymeric thermoplastic material; and
    interlayer microcellular cells formed from a side of a first layer and a side of a second layer that is juxtaposed next to the first layer, wherein each interlayer microcellular cell comprises a cell wall of a first thermoplastic polymer layer and a cell wall of a second thermoplastic polymer layer, wherein the second layer is juxtaposed next to the first layer, and the first thermoplastic polymer is different from the second thermoplastic polymer.

12. The microcellular thin film of claim 11, wherein the thin film is flexible.

13. The microcellular thin film of claim 11, comprising a relative density of 5% to 99%.

14. The microcellular thin film of claim 11, comprising two or more layers of the same or different polymeric material.

15. The microcellular thin film of claim 14, wherein the two or more layers are a thermoplastic material.

16. The microcellular thin film of claim 14, wherein the two or more layers are selected from the group consisting of poly(lactic acid), polyethylene, ethylene vinyl acetate, low density polyethylene, methylacrylate, an EMA polymer and a cyclic olefin copolymer.

17. The microcellular thin film of claim 11, comprising a first and a second layer each layer being juxtaposed next to only one other layer, the first and the second layer being the exteriormost layer on the first and the second side of the thin film.

18. The microcellular thin film of claim 17, wherein the first and the second exteriormost layer on the first and the second side of the thin film are a different polymeric material than any other layer.

19. The microcellular thin film of claim 17, wherein the first and the second exteriormost layer on the first and the second side of the thin film are a different polymeric material from each other.

20. The microcellular thin film of claim 17, wherein the first and the second exteriormost layer on the first and the second side of the thin film are the only layers in the thin film.

21. The microcellular thin film of claim 17, further comprising a plurality of interior layers between the first and the second exteriormost layer, wherein the interior layers comprise alternating layers of different polymeric materials.

22. The microcellular thin film of claim 17, further comprising a plurality of interior layers between the first and the second exteriormost layer, wherein the interior layers are the same polymeric material.

23. The microcellular thin film of claim 17, further comprising a plurality of interior layers between the first and the second exteriormost layer, wherein the exteriormost and interior layers are the same polymeric material.

24. The microcellular thin film of claim 17, further comprising cells between the first and second layer.

25. The microcellular thin film of claim 11, prepared from a solid thin film having a thickness in the range of 0.01 mm to 0.25 mm.

* * * * *